(12) United States Patent
Wenzel et al.

(10) Patent No.: US 12,216,452 B2
(45) Date of Patent: *Feb. 4, 2025

(54) HIGH LEVEL CENTRAL PLANT OPTIMIZATION

(71) Applicant: Johnson Controls Technology Company, Auburn Hills, MI (US)

(72) Inventors: Michael J. Wenzel, Oak Creek, WI (US); Robert D. Turney, Watertown, WI (US); Kirk H. Drees, Cedarburg, WI (US); Matthew J. Asmus, Watertown, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/468,118

(22) Filed: Sep. 15, 2023

(65) Prior Publication Data

US 2024/0061404 A1    Feb. 22, 2024

Related U.S. Application Data

(63) Continuation of application No. 17/148,123, filed on Jan. 13, 2021, now Pat. No. 11,774,948, which is a
(Continued)

(51) Int. Cl.
G05B 19/418   (2006.01)
G05B 13/04    (2006.01)
(Continued)

(52) U.S. Cl.
CPC ......... G05B 19/418 (2013.01); G05B 13/048 (2013.01); G05B 15/02 (2013.01);
(Continued)

(58) Field of Classification Search
CPC .... G05B 19/418; G05B 13/048; G05B 15/02; G05B 2219/2639; G05B 2219/2642;
(Continued)

(56) References Cited

U.S. PATENT DOCUMENTS 4,349,869 A    9/1982 Prett et al.
4,616,308 A   10/1986 Morshedi et al.
(Continued)

FOREIGN PATENT DOCUMENTS

CA    2957726 A1    3/2016
CA    3043996 A1    2/2018
(Continued)

OTHER PUBLICATIONS

Afram et al., "Theory and Application of HVAC Control Systems—A review of Model Predictive Control (MPC)," Building and Environment, Feb. 2014, vol. 72 (pp. 343-355).
(Continued)

*Primary Examiner* — Kidest Bahta
(74) *Attorney, Agent, or Firm* — Foley & Lardner LLP

(57) ABSTRACT

A controller for equipment that operate to provide heating or cooling to a building or campus includes a processing circuit configured to obtain utility rate data indicating a price of resources consumed by the equipment to serve energy loads of the building or campus, obtain an objective function that expresses a total monetary cost of operating the equipment over an optimization period as a function of the utility rate data and an amount of the resources consumed by the equipment, determine a relationship between resource consumption and load production of the equipment, optimize the objective function over the optimization subject to a constraint based on the relationship between the resource consumption and the load production of the equipment to determine a distribution of the load production across the
(Continued)

equipment, and operate the equipment to achieve the distribution.

20 Claims, 9 Drawing Sheets

Related U.S. Application Data continuation of application No. 16/214,984, filed on Dec. 10, 2018, now Pat. No. 10,915,094, which is a continuation of application No. 14/634,609, filed on Feb. 27, 2015, now Pat. No. 10,175,681.

(60) Provisional application No. 61/987,361, filed on May 1, 2014.

(51) Int. Cl.
　　*G05B 15/02*　　　(2006.01)
　　*G06N 20/00*　　　(2019.01)
　　*G06Q 10/04*　　　(2023.01)
　　*G06Q 10/06*　　　(2023.01)
　　*G06Q 50/06*　　　(2012.01)

(52) U.S. Cl.
　　CPC ............. *G06N 20/00* (2019.01); *G06Q 10/04* (2013.01); *G06Q 10/06* (2013.01); *G06Q 50/06* (2013.01); *G05B 2219/2639* (2013.01); *G05B 2219/2642* (2013.01); *G05B 2219/31414* (2013.01); *G05B 2219/32021* (2013.01); *Y02P 70/10* (2015.11); *Y02P 80/10* (2015.11)

(58) Field of Classification Search
　　CPC ........... G05B 2219/31414; G05B 2219/32021; G06N 20/00; G06Q 10/04; G06Q 10/06; G06Q 50/06; Y02P 70/10; Y02P 80/10; Y02P 90/80; Y02B 70/3225; Y04S 20/222
　　See application file for complete search history.

(56) References Cited

U.S. PATENT DOCUMENTS

| | | | |
|---|---|---|---|
| 5,301,101 A | 4/1994 | Macarthur et al. |
| 5,347,446 A | 9/1994 | Iino et al. |
| 5,351,184 A | 9/1994 | Lu et al. |
| 5,408,406 A | 4/1995 | Mathur et al. |
| 5,442,544 A | 8/1995 | Jelinek |
| 5,519,605 A | 5/1996 | Cawlfield |
| 5,572,420 A | 11/1996 | Lu |
| 5,579,993 A | 12/1996 | Ahmed et al. |
| 5,778,059 A | 7/1998 | Loghmani et al. |
| 5,924,486 A | 7/1999 | Ehlers et al. |
| 5,963,458 A | 10/1999 | Cascia |
| 6,055,483 A | 4/2000 | Lu |
| 6,122,555 A | 9/2000 | Lu |
| 6,278,899 B1 | 8/2001 | Piche et al. |
| 6,347,254 B1 | 2/2002 | Lu |
| 6,459,939 B1 | 10/2002 | Hugo |
| 6,807,510 B1 | 10/2004 | Backstrom et al. |
| 7,050,863 B2 | 5/2006 | Mehta et al. |
| 7,050,866 B2 | 5/2006 | Martin et al. |
| 7,113,890 B2 | 9/2006 | Frerichs et al. |
| 7,152,023 B2 | 12/2006 | Das |
| 7,165,399 B2 | 1/2007 | Stewart |
| 7,188,779 B2 | 3/2007 | Alles |
| 7,197,485 B2 | 3/2007 | Fuller |
| 7,203,554 B2 | 4/2007 | Fuller |
| 7,266,416 B2 | 9/2007 | Gallestey et al. |
| 7,272,454 B2 | 9/2007 | Wojsznis et al. |
| 7,275,374 B2 | 10/2007 | Stewart et al. |
| 7,328,074 B2 | 2/2008 | Das et al. |
| 7,328,577 B2 | 2/2008 | Stewart et al. |
| 7,376,471 B2 | 5/2008 | Das et al. |
| 7,376,472 B2 | 5/2008 | Wojsznis et al. |
| 7,389,773 B2 | 6/2008 | Stewart et al. |
| 7,400,933 B2 | 7/2008 | Rawlings et al. |
| 7,418,372 B2 | 8/2008 | Nishira et al. |
| 7,424,409 B2 | 9/2008 | Ben-Gal et al. |
| 7,454,253 B2 | 11/2008 | Fan |
| 7,496,413 B2 | 2/2009 | Fan et al. |
| 7,577,483 B2 | 8/2009 | Fan et al. |
| 7,580,775 B2 | 8/2009 | Kulyk et al. |
| 7,591,135 B2 | 9/2009 | Stewart |
| 7,610,108 B2 | 10/2009 | Boe et al. |
| 7,650,195 B2 | 1/2010 | Fan et al. |
| 7,664,573 B2 | 2/2010 | Ahmed |
| 7,676,283 B2 | 3/2010 | Liepold et al. |
| 7,826,909 B2 | 11/2010 | Attarwala |
| 7,827,813 B2 | 11/2010 | Seem |
| 7,844,352 B2 | 11/2010 | Vouzis et al. |
| 7,856,281 B2 | 12/2010 | Thiele et al. |
| 7,873,441 B2 | 1/2011 | Synesiou et al. |
| 7,878,178 B2 | 2/2011 | Stewart et al. |
| 7,894,943 B2 | 2/2011 | Sloup et al. |
| 7,894,946 B2 | 2/2011 | Kulyk et al. |
| 7,930,045 B2 | 4/2011 | Cheng |
| 7,945,352 B2 | 5/2011 | Koc |
| 7,949,416 B2 | 5/2011 | Fuller |
| 7,987,145 B2 | 7/2011 | Baramov |
| 7,996,140 B2 | 8/2011 | Stewart et al. |
| 8,005,575 B2 | 8/2011 | Kirchhof |
| 8,032,235 B2 | 10/2011 | Sayyar-Rodsari |
| 8,036,758 B2 | 10/2011 | Lu et al. |
| 8,046,089 B2 | 10/2011 | Renfro et al. |
| 8,060,258 B2 | 11/2011 | Butoyi |
| 8,060,290 B2 | 11/2011 | Stewart et al. |
| 8,073,659 B2 | 12/2011 | Gugaliya et al. |
| 8,078,291 B2 | 12/2011 | Pekar et al. |
| 8,096,140 B2 | 1/2012 | Seem |
| 8,105,029 B2 | 1/2012 | Egedal et al. |
| 8,109,255 B2 | 2/2012 | Stewart et al. |
| 8,121,818 B2 | 2/2012 | Gorinevsky |
| 8,126,575 B2 | 2/2012 | Attarwala |
| 8,145,329 B2 | 3/2012 | Pekar et al. |
| 8,180,493 B1 | 5/2012 | Laskow |
| 8,185,217 B2 | 5/2012 | Thiele |
| 8,200,346 B2 | 6/2012 | Thiele |
| 8,219,250 B2 | 7/2012 | Dempster et al. |
| 8,275,483 B2 | 9/2012 | Higgins |
| 8,291,720 B2 | 10/2012 | Hartman |
| 8,412,381 B2 | 4/2013 | Nikovski et al. |
| 8,417,392 B2 | 4/2013 | Higgins |
| 8,495,888 B2 | 7/2013 | Seem |
| 8,527,108 B2 | 9/2013 | Kulyk et al. |
| 8,527,109 B2 | 9/2013 | Kulyk et al. |
| 8,600,561 B1 | 12/2013 | Modi et al. |
| 8,660,704 B2 | 2/2014 | Higgins |
| 8,774,978 B2 | 7/2014 | Higgins et al. |
| 8,818,563 B2 | 8/2014 | Gwerder et al. |
| 8,843,238 B2 | 9/2014 | Wenzel et al. |
| 8,897,921 B2 | 11/2014 | Dempster et al. |
| 8,903,554 B2 | 12/2014 | Stagner |
| 8,918,223 B2 | 12/2014 | Kulyk et al. |
| 8,930,030 B2 | 1/2015 | Bester et al. |
| 9,002,532 B2 | 4/2015 | Asmus |
| 9,110,647 B2 | 8/2015 | Kulyk et al. |
| 9,235,657 B1 | 1/2016 | Wenzel et al. |
| 9,285,135 B2 | 3/2016 | Gao et al. |
| 9,367,053 B2 | 6/2016 | Kuhlmann et al. |
| 9,429,921 B2 | 8/2016 | Lu et al. |
| 9,429,923 B2 | 8/2016 | Ward et al. |
| 9,436,179 B1 | 9/2016 | Turney et al. |
| 9,447,985 B2 | 9/2016 | Johnson |
| 9,535,411 B2 | 1/2017 | Wei et al. |
| 9,546,795 B2 | 1/2017 | Pienta et al. |
| 9,679,248 B2 | 6/2017 | Lecue et al. |
| 9,703,339 B2 | 7/2017 | Kulyk et al. |
| 9,709,966 B2 | 7/2017 | Chandan et al. |
| 9,746,199 B1 | 8/2017 | Drees et al. |
| 9,746,213 B2 | 8/2017 | Warren |
| 9,746,228 B2 | 8/2017 | Sibik |

(56) References Cited

U.S. PATENT DOCUMENTS

| | | |
|---|---|---|
| 9,817,383 B1 | 11/2017 | Sinha et al. |
| 9,852,481 B1 | 12/2017 | Turney et al. |
| 9,892,472 B2 | 2/2018 | Ji et al. |
| 9,915,178 B2 | 3/2018 | Sun et al. |
| 9,957,970 B2 | 5/2018 | Tateishi et al. |
| 9,967,107 B2 | 5/2018 | Jones et al. |
| 9,973,129 B2 | 5/2018 | Schuster et al. |
| 9,989,943 B2 | 6/2018 | Clanin et al. |
| 9,995,509 B2 | 6/2018 | Cline |
| 10,077,915 B2 | 9/2018 | Lu et al. |
| 10,101,731 B2 | 10/2018 | Asmus et al. |
| 10,139,877 B2 | 11/2018 | Kulyk et al. |
| 10,871,756 B2 | 12/2020 | Johnson et al. |
| 10,908,578 B2 | 2/2021 | Johnson et al. |
| 10,921,768 B2 | 2/2021 | Johnson et al. |
| 11,156,978 B2 | 10/2021 | Johnson et al. |
| 2003/0033587 A1 | 2/2003 | Ferguson et al. |
| 2003/0055798 A1 | 3/2003 | Hittle et al. |
| 2004/0133314 A1* | 7/2004 | Ehlers ............... F24F 11/523 |
| | | 705/412 |
| 2004/0225649 A1 | 11/2004 | Yeo et al. |
| 2005/0240427 A1 | 10/2005 | Crichlow |
| 2006/0065750 A1 | 3/2006 | Fairless |
| 2007/0005191 A1 | 1/2007 | Sloup et al. |
| 2009/0062969 A1 | 3/2009 | Chandra et al. |
| 2009/0313083 A1 | 12/2009 | Dillon et al. |
| 2009/0319090 A1 | 12/2009 | Dillon et al. |
| 2010/0087933 A1 | 4/2010 | Cheng |
| 2010/0235004 A1 | 9/2010 | Thind |
| 2010/0269854 A1 | 10/2010 | Barbieri et al. |
| 2011/0022193 A1 | 1/2011 | Panaitescu |
| 2011/0060424 A1 | 3/2011 | Havlena |
| 2011/0061015 A1 | 3/2011 | Drees et al. |
| 2011/0066258 A1 | 3/2011 | Torzhkov et al. |
| 2011/0066298 A1 | 3/2011 | Francino et al. |
| 2011/0080548 A1 | 4/2011 | Sonoda et al. |
| 2011/0088000 A1 | 4/2011 | Mackay |
| 2011/0125293 A1 | 5/2011 | Havlena |
| 2011/0153090 A1* | 6/2011 | Besore ............... G05B 15/02 |
| | | 700/278 |
| 2011/0153103 A1 | 6/2011 | Brown et al. |
| 2011/0257789 A1 | 10/2011 | Stewart et al. |
| 2011/0301723 A1 | 12/2011 | Pekar et al. |
| 2012/0010757 A1 | 1/2012 | Francino et al. |
| 2012/0010758 A1 | 1/2012 | Francino et al. |
| 2012/0059351 A1 | 3/2012 | Nordh |
| 2012/0060505 A1 | 3/2012 | Fuller et al. |
| 2012/0109620 A1 | 5/2012 | Gaikwad et al. |
| 2012/0116546 A1 | 5/2012 | Sayyar-Rodsari |
| 2012/0185728 A1 | 7/2012 | Guo et al. |
| 2012/0259469 A1 | 10/2012 | Ward et al. |
| 2012/0290230 A1 | 11/2012 | Berges Gonzalez et al. |
| 2012/0308988 A1 | 12/2012 | Discenzo |
| 2012/0316914 A1 | 12/2012 | Lee et al. |
| 2013/0003543 A1 | 1/2013 | Ludwig |
| 2013/0006439 A1 | 1/2013 | Selvaraj et al. |
| 2013/0013121 A1 | 1/2013 | Henze et al. |
| 2013/0125565 A1 | 5/2013 | Erpelding et al. |
| 2013/0144451 A1 | 6/2013 | Kumar et al. |
| 2013/0178993 A1 | 7/2013 | Rombouts et al. |
| 2013/0179373 A1 | 7/2013 | Mutchnik et al. |
| 2013/0262654 A1 | 10/2013 | Masli et al. |
| 2013/0345880 A1 | 12/2013 | Asmus |
| 2014/0032255 A1 | 1/2014 | Hegazi |
| 2014/0039965 A1 | 2/2014 | Steven et al. |
| 2014/0049545 A1 | 2/2014 | Losee et al. |
| 2014/0216685 A1 | 8/2014 | Bicknell |
| 2014/0257907 A1 | 9/2014 | Chen et al. |
| 2014/0266682 A1 | 9/2014 | Gettings et al. |
| 2014/0358508 A1 | 12/2014 | Raghunathan et al. |
| 2014/0379139 A1 | 12/2014 | Dempster |
| 2015/0134135 A1 | 5/2015 | Wong et al. |
| 2015/0185716 A1 | 7/2015 | Wichmann et al. |
| 2015/0198345 A1 | 7/2015 | Bicknell |
| 2015/0316903 A1 | 11/2015 | Asmus et al. |
| 2015/0316907 A1 | 11/2015 | Elbsat et al. |
| 2015/0370271 A1 | 12/2015 | Raghunathan et al. |
| 2016/0004798 A1 | 1/2016 | Crawford et al. |
| 2016/0061469 A1 | 3/2016 | Albonesi et al. |
| 2016/0246269 A1 | 8/2016 | Ahmed et al. |
| 2016/0283844 A1 | 9/2016 | Jones et al. |
| 2017/0045257 A1 | 2/2017 | Moffitt |
| 2017/0052536 A1 | 2/2017 | Warner et al. |
| 2017/0179716 A1 | 6/2017 | Vitullo et al. |
| 2017/0198933 A1 | 7/2017 | Erpelding et al. |
| 2017/0241661 A1 | 8/2017 | Erpelding et al. |
| 2017/0256987 A1 | 9/2017 | Buchstaller et al. |
| 2017/0315580 A1 | 11/2017 | Dempster |
| 2017/0343267 A1 | 11/2017 | Erpelding et al. |
| 2018/0113482 A1 | 4/2018 | Vitullo |
| 2018/0129232 A1 | 5/2018 | Hriljac et al. |
| 2018/0217621 A1 | 8/2018 | Biesterveld et al. |
| 2018/0231967 A1 | 8/2018 | Cohen et al. |
| 2018/0297443 A1* | 10/2018 | Gibble ............... B60H 1/00842 |
| 2021/0193309 A1 | 6/2021 | Boisvert et al. |
| 2021/0390807 A1 | 12/2021 | Chaurasia et al. |
| 2021/0390812 A1 | 12/2021 | Chaurasia et al. |
| 2021/0391089 A1 | 12/2021 | Eswara et al. |
| 2021/0398659 A1 | 12/2021 | Sharma et al. |
| 2021/0398690 A1 | 12/2021 | Gibson et al. |
| 2021/0398691 A1 | 12/2021 | Dhamija et al. |
| 2022/0060856 A1 | 2/2022 | Wellig et al. |

FOREIGN PATENT DOCUMENTS

| | | |
|---|---|---|
| CN | 201297253 Y | 8/2009 |
| CN | 201297257 Y | 8/2009 |
| CN | 101900448 A | 12/2010 |
| CN | 201837139 U | 5/2011 |
| CN | 102331758 A | 1/2012 |
| CN | 102331759 A | 1/2012 |
| CN | 102893227 A | 1/2013 |
| CN | 203464552 U | 3/2014 |
| CN | 204678489 | 9/2015 |
| CN | 106500274 A | 3/2017 |
| CN | 106940075 A | 7/2017 |
| CN | 107238180 A | 10/2017 |
| CN | 106640655 B | 12/2017 |
| CN | 107525319 A | 12/2017 |
| CN | 108317588 A | 7/2018 |
| EP | 1 156 286 A2 | 11/2001 |
| EP | 2 686 937 B1 | 1/2014 |
| EP | 3 186 687 A4 | 7/2017 |
| EP | 3 497 377 A1 | 6/2019 |
| JP | 2016-061487 | 4/2016 |
| JP | 2019-049931 | 3/2019 |
| KR | 1548136 B1 | 8/2015 |
| WO | WO-2011/072332 A1 | 6/2011 |
| WO | WO-2011/080547 A1 | 7/2011 |
| WO | WO-2011/080548 A1 | 7/2011 |
| WO | WO-2012/161804 A1 | 11/2012 |
| WO | WO-2013/130956 A1 | 9/2013 |
| WO | WO-2014/043623 A1 | 3/2014 |
| WO | WO-2014/124353 A1 | 8/2014 |
| WO | WO-2014/153552 A1 | 9/2014 |
| WO | WO-2015/077754 A1 | 5/2015 |
| WO | WO-2015/174176 A1 | 11/2015 |
| WO | WO-2018/132770 A1 | 1/2017 |
| WO | WO-2017/084371 A1 | 5/2017 |
| WO | WO-2021/258116 A1 | 12/2021 |

OTHER PUBLICATIONS

Ahn et al., "Optimal Control Development for Chilled Water Plants Using a Quadratic Representation," Energy and Buildings, Apr. 2001, vol. 33, No. 4 (pp. 371-378).

Ashok et al., "An Optimization Mode for Industrial Load Management," IEEE Transactions on Power Systems, Nov. 2001, vol. 16, No. 4 (pp. 879-884).

Astrom, K., "Optimal Control of Markov Decision Processes with Incomplete State Estimation," Journal of Mathematical Analysis and Applications, Feb. 1965, vol. 10, No. 1 (pp. 174-205).

(56) References Cited

OTHER PUBLICATIONS

Bittanti, S. et al., Adaptive Control of Linear Time Invariant Systems: The "Bet on the Best" Principle, Communications in Information and Systems, 2006, vol. 6, No. 4 (pp. 299-320).
Burer et al., "Non-convex Mixed-Integer Nonlinear Programming: A Survey," Surveys in Operations Research and Management Science, Jul. 2012, vol. 17, No. 2 (pp. 97-106).
Calma, "Tesla promises cars that connect to the grid, even if Elon Musk doesn't really want them to," The Verge, Sep. 23, 2020, https://www.theverge.com/2020/9/23/21451642/tesla-ev-electric-vehicle-energy-grid-battery-day-elon-musk; retrieved from the internet May 1, 2023 (7 pages).
Cantoni, A., "Optimal Curve Fitting with Piecewise Linear Functions," IEEE Transactions on Computers, Jan. 1971, vol. 20, No. (pp. 59-67).
Chang et al., "Optimal chiller sequencing by branch and boun method for saving energy," Energy Conservation and Management, 2005, 46, pp. 2158-2172.
Chen et al., "Control-oriented System Identification: an H1 Approach," Wiley-Interscience, 2000, 19, Chapters 3 & 8, 38 pages.
CN Office Action on Chinese Patent Application No. 201610104416.7 dated Mar. 26, 2018. (3 pages).
CN Office Action on Chinese Patent Application No. 201610107795.5 dated Mar. 28, 2018 (14 pages).
Cole et al., "Use of model predictive control to enhance the flexibility of thermal energy storage cooling systems," 2012 American Control Conference, Fairmont Queen Elizabeth, Montreal, Canada, Jun. 27-29, 2012 (pp. 2788-2793).
Coolinglogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).
Delbert, "Tesla's Virtual Power Plant Is Already a Success, And it's only getting bigger," Popular Mechanics, Apr. 10, 2020, https://www.popularmechanics.com/science/a31977069/tesla-virtual-power-plant/; retrieved from the internet May 1, 2023 (7 pages).
Deng et al., "Optimal Scheduling of Chiller Plant with Thermal Energy Storage using Mixed Integer Linear Programming," American Control Conference (ACC), Washington DC, USA, Jun. 17-19, 2013 (pp. 2958-2963).
Drgona et al., "All you Need to Know about Model Predictive Control for Buildings," Annual Reviews in Control, 2020, vol. 50 (pp. 190-232).
EP Extended Search Report on EP Appl. Ser. No. EP 22192523 dated Nov. 15, 2022 (8 pages).
EP Office Action for EP Appl. Ser. No. 16154940.7 dated Oct. 16, 2017 (4 pages).
EP Office Action for EP Appl. Ser. No. 16154938.1 dated Mar. 27, 2017 (5 pages).
EP Office Action for EP Appl. Ser. No. 16154938.1 dated Mar. 6, 2018 (5 pages).
EP Office Action for EP Appl. Ser. No. 16154938.1 dated Oct. 11, 2017 (4 pages).
EP Office Action for EP Appl. Ser. No. 16154940.7 dated Mar. 28, 2017 (5 pages).
EP Office Action for EP Appl. Ser. No. 16154940.7 dated Mar. 9, 2018 (4 pages).
EP Office Action on EP Appl. Ser. No. 16154938.1 dated Aug. 15, 2018 (4 pages).
EP Office Action on EP Appl. Ser. No. 19214769.2, dated Nov. 18, 2020 (6 pages).
EP Office Action on EP Appl. Ser. No. 19214769.2, dated Apr. 13, 2021 (6 pages).
EP Office Action on EP Appl. Ser. No. 19214769.2, dated Sep. 6, 2021 (4 pages).
EPO Notice of Opposition to a European Patent issued in Appl. Ser. No. EP 16165681.4 dated May 2, 2023 (48 pages).
EPO Notice of Opposition to a European Patent issued in Appl. Ser. No. EP 16165681.4 dated May 2, 2023 (51 pages).
EPO Notice of Opposition to a European Patent with Consolidated List issued in EP Appl. Ser. No. 16165681.4 dated May 2, 2023 (4 pages).
EPO Office Action on EP Appl. Ser. No. 16165681.4 dated Apr. 6, 2021 (7 pages).
Extended European Search Report for EP Appl. Ser. No. 16154938.1 dated Jun. 23, 2016 (8 pages).
Extended European Search Report for EP Appl. Ser. No. 16154940.7 dated Jun. 30, 2016 (7 pages).
Extended European Search Report on EP Appl. Ser. No. 16165681.4 dated Oct. 20, 2016 (5 pages).
Extended European Search Report on EP Appl. Ser. No. 19214769.2, dated Mar. 11, 2020 (8 pages).
Extended European Search Report on EP Appl. Ser. No. 22177772.5 dated Sep. 26, 2022 (11 pages).
Feng, J. et al., "Model Predictive Control of Radiant Slab Systems with Evaporative Cooling Sources," Energy and Buildings, 2015, 87, pp. 199-210.
George et al., "Time Series Analysis: Forecasting and Control", Fifth Edition, John Wiley & Sons, 2016, Chapters 4-7 and 13-15, 183 pages.
Guan et al., "Energy-Efficient Buildings Facilitated by Microgrid," IEEE Transactions on Smart Grid, Dec. 2010, 1.3, pp. 243-252.
Gunter et al., "Optimal Design of Grid-Connected PEV Charging Systems With Integrated Distributed Resources," IEEE Transactions on Smart Grid, Jun. 2013, vol. 4, No. 2 (pp. 956-967).
Hackner, J.R., "HVAC system dynamics and energy use in existing buildings," Doctoral Dissertation, University of Madison, Wisconsin, 1984 (174 pages).
Hardt, M. et al., "Gradient Descent Learns Linear Dynamical Systems", Journal of Machine Learning Research, 2018, 19, pp. 1-44.
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Helmicki, A. et al. "Control Oriented System Identification: a Worst-case/deterministic Approach in H1," IEEE Transactions on Automatic Control, 1991, 36.10, pp. 1163-1176.
Henze et al., "Optimization of Building Thermal Mass Control in the Presence of Energy and Demand Charges," ASHRAE Transactions, 2008, vol. 114, part 2 (pp. 75-84).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
Infanger, "Planning Under Uncertainty: Solving Large-Scale Stochastic Linear Programs," Department of Operation Research, Stanford University, Technical Report SOL-92-8, Dec. 1992 (118 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

(56) References Cited

OTHER PUBLICATIONS

Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Kapoor et al., "Improved Large-Scale Process Cooling Operation through Energy Optimization," Processes, Nov. 22, 2013, 1, pp. 312-329.
Kelman et al., "Analysis of Local Optima in Predictive Control for Energy Efficient Buildings," Journal of Building Performance Simulation, Apr. 16, 2012, vol. 6, No. 3 (pp. 236-255).
Kelman, A. et al., "Bilinear Model Predictive Control of a HVAC System Using Sequential Quadratic Programming", Proceedings of the IFAC World Congress, Sep. 2, 2011, 6 pages.
Kingma, D. et al., "Adam: A Method for Stochastic Optimization", International Conference on Learning Representations (ICLR), 2015, 15 pages.
Klitin et al., "Stochastic Load Flows," IEEE Transactions on Power Apparatus and Systems, Mar./Apr. 1975, vol. PAS-94, No. 2, pp. 299-309.
Koehler et al., "Building Temperature Distributed Control via Explicit MPC and 'Trim and Respond' Methods," European Control Conference (ECC), Jul. 17-19, 2013, Zurich, Switzerland (pp. 4334-4339).
Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17- 20, 2013 (pp. 442-447).
Lambert, "Honda is working on bi-directional charging technology for its electric vehicles, installs station at HQ," Elektrek, Dec. 7, 2017, https://electrek.co/2017/12/07/honda-bi-directional-charging-technology-electric-vehicles/; retrieved from the internet May 1, 2023 (6 pages).
Lambert, "Nissan launches 'Nissan Energy' to commercialize vehicle-to-home/building with the Leaf," Elektrek, Nov. 28, 2018, https://electrek.co/2018/11/28/nissan-energy-leaf-vehicle-to-home-building/, retrieved from the internet May 1, 2023 (8 pages).
Lambert, "Tesla announces unlimited overnight charging for $30 per month," Elektrek, Mar. 1, 2023, https://electrek.co/2023/03/01/tesla-unlimited-overnight-charging-30-month/; retrieved from the internet May 1, 2023 (6 pages).
Lambert, "Tesla launches new feature to help solar homeowners charge with excess solar power," Elektrek, Mar. 16, 2023, https://electrek.co/2023/03/16/tesla-launches-feature-help-solar-homeowners-charge-excess-solar-power/; retrieved form the internet May 1, 2023 (6 pages).
Lazic, N. et al., "Data center cooling using model-predictive control", 32nd Conference on Neural Information Processing Systems, 2018, 10 pages.
Leith, "Objective Methods for Weather Prediction," Annual Review of Fluid Mechanics, 1978, vol. 10 (pp. 107-128).

(56) References Cited

OTHER PUBLICATIONS

Ljung (ed.), "System Identification: Theory for the User", 2nd Edition, Prentice Hall, Upper Saddle River, New Jersey, 1999, Chapters 5 and 7, 40 pages.

Ljung et al., "Theory and Practice of Recursive Identification," vol. 5. JSTOR, 1983, Chapters 2, 3 & 7, 80 pages.

Lopatto, "I went to Australia to test out Tesla's vision of the future," The Verge, Jun. 25, 2019, https://www.theverge.com/2019/6/25/18715585/tesla-australia-renewable-energy-houses-electrical-grid-battery-installation; retrieved from the internet May 1, 2023 (22 pages).

Lyons, "Here are Tesla's biggest announcements from Battery Day," The Verge, Sep. 22, 2020, https://www.theverge.com/2020/9/22/21450840/tesla-battery-day-production-elon-musk-tabless-range-cathode-cobalt-plaid; retrieved for the internet on May 1, 2023 (6 pages).

Ma, Y. et al., "Model Predictive Control for the Operation of Building Cooling Systems", IEEE Transactions on Control Systems Technology, May 2012, 20:3, pp. 796-803.

Ma, Y. et al., "Predictive Control for Energy Efficient Buildings with Thermal Storage: Modeling, Stimulation, and Experiments", IEEE Control Systems, Feb. 2012, 32.1, pp. 44-64.

Mckenna et al., "A TRNSYS model of a building HVAC system with GSHP and PCM thermal energy storage-component modelling and validation," Proceedings of BS2013: 13th Conference of International Building Performance Simulation Association, Chambéry, France, Aug. 26-28, 2013 (pp. 3336-3343).

Mossolly et al., "Optimal Control Strategy for a Multizone Air Conditioning System Using a Genetic Algorithm," Energy, Jan. 2009, vol. 34, No. 1 (pp. 58-66).

Nassif et al., "Optimization of HVAC Control System Strategy Using Two-Objective genetic Algorithm," International Journal of HVA C&R Research, vol. 11, No. 3 (pp. 459-486).

Oldewurtel et al., "Energy Efficient Building Climate Control using Stochastic Model Predictive Control and Weather Predictions," American Control Conference, Jun. 30-Jul. 2, 2010, 6 pages.

Oldewurtel et al., "Use of model predictive control and weather forecasts for energy efficient building climate control," Energy and Buildings, 2012, vol. 45 (pp. 15-27).

Second Office Action on Chinese Patent Appl. Ser. No. 201610104416.7 dated Nov. 20, 2018 (14 pages).

Second Office Action on Chinese Patent Appl. Ser. No. 201610107795.5 dated Nov. 20, 2018 (34 pages).

Shahan, "Tesla CTO JB Straubel On Why EVs Selling Electricity To The Grid Is Not As Swell As It Sounds," Clean Technica, Aug. 22, 2016, https://cleantechnica.com/2016/08/22/vehicle-to-grid-used-ev-batteries-grid-storage/; retrieved from the internet May 1, 2023 (13 pages).

Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).

Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).

Strurznegger, D., "Model Predictive Building Climate Control, Steps Towards Practice," Doctoral Thesis, Automatic Control Laboratory, Zurich, Switzerland, 2014 (176 pages).

Sun et al., Optimal Control of Building HVAC&R Systems Using Complete Simulation-Based Sequential Quadratic Programming (CSB-SQP), Building and Environment, May 2005, vol. 40, No. 5 (pp. 657-669).

TESLA—"How Powerwall Works" tesla.com, Publication Date: Unknown; first date this website was archived on the Wayback Machine was May 13, 2020, https://www.tesla.com/support/energy/powerwall/learn/how-powerwall-works; retrieved from the internet on May 1, 2023 (4 pages).

Third Office Action on Chinese application No. 201610104416.7 dated Jun. 24, 2019, (9 pages).

Third Office Action on Chinese Application No. on 201610107795.5 dated Jun. 25, 2019 (8 pages).

Third Party Observation Report on EP Appl. Ser. No. 16165681.4 dated Jan. 15, 2020 (8 pages).

Third Party Observation Report on EP Appl. Ser. No. 16165681.4 dated Oct. 5, 2018 (6 pages).

Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).

Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).

Walton, "Tesla software update allows Powerwall 2 owners to optimize for time-varying rates," Utility Dive, May 15, 2018, https://www.utilitydive.com/news/tesla-software-update-allows-powerwall-2-owners-to-optimize-for-time-varyin/523588/; retrieved from the internet May 1, 2023 (4 pages).

Wang et al., "Model-Based Optimal Control of VAV Air-Conditioning System Using Genetic Algorithm," Building and Environment, Aug. 2000, vol. 35, No. 6 (pp. 471-487).

Wang et al., "Supervisory and Optimal Control of Building HVAC Systems: A Review," HVAC&R Research, Jan. 2008, vol. 14, No. 1 (pp. 3-32).

Ward, J. et al., "Beyond Comfort—Managing the Impact of HVAC Control on the Outside World", Proceedings of Conference: Air Conditioning and the Low Carbon Cooling Challenge, Cumberland Lodge, Windsor, UK, London: Network for Comfort and Energy Use in Buildings, http://nceub.org.uk, Jul. 27-29, 2008 (15 pages).

Wenzel et al., "Model Predictive Control for Central Plant Optimization with Thermal Energy Storage," International High Performance Buildings Conference, Jul. 14-17, 2014, Paper 122 (11 pages).

Xi et al., "Support Vector Regression Model Predictive Control on a HVAC Plant," Control Engineering Practice, Aug. 2007, vol. 15, No. 8 (pp. 897-908).

Yao et al., "Global Optimization of a Central Air-Conditioning System Using Decomposition-Coordination Method," Energy and Buildings, May 2010, vol. 42, No. 5 (pp. 570-583).

Zakeri et al., Optimization of Demand Response Through Peak Shaving, Oct. 25, 2013 (9 pages).

EP Search Report for Appl. Ser. No. EP 24167441 dated Jul. 5, 2024 (9 pages).

* cited by examiner

HIGH LEVEL CENTRAL PLANT OPTIMIZATION

CROSS-REFERENCE TO RELATED PATENT APPLICATIONS

This application is a continuation of U.S. patent application Ser. No. 17/148,123 filed Jan. 13, 2021, which is a continuation of U.S. patent application Ser. No. 16/214,984 filed Dec. 10, 2018 (now U.S. Pat. No. 10,915,094), which is a continuation of U.S. patent application Ser. No. 14/634,609 filed Feb. 27, 2015 (now U.S. Pat. No. 10,175,681), which claims the benefit of and priority to U.S. Provisional Patent Application No. 61/987,361 filed May 1, 2014. The entire disclosures of each of these patent applications and patents are incorporated by reference herein.

BACKGROUND

The present disclosure relates generally to the operation of a central plant for serving building thermal energy loads. The present disclosure relates more particularly to systems and methods for distributing building thermal energy loads across a plurality of subplants configured to serve the building thermal energy loads.

A central plant may include various types of equipment configured to serve the thermal energy loads of a building or campus (i.e., a system of buildings). For example, a central plant may include heaters, chillers, heat recovery chillers, cooling towers, or other types of equipment configured to provide heating or cooling for the building. A central plant may consume resources from a utility (e.g., electricity, water, natural gas, etc.) to heat or cool a working fluid (e.g., water, glycol, etc.) that is circulated to the building or stored for later use to provide heating or cooling for the building. Fluid conduits typically deliver the heated or chilled fluid to air handlers located on the rooftop of the building or to individual floors or zones of the building. The air handlers push air past heat exchangers (e.g., heating coils or cooling coils) through which the working fluid flows to provide heating or cooling to the air. The working fluid then returns to the central plant to receive further heating or cooling and the cycle continues.

High efficiency equipment can help reduce the amount of energy consumed by a central plant; however, the effectiveness of such equipment is highly dependent on the control technology that is used to distribute the load across the multiple subplants. For example, it may be more cost efficient to run heat pump chillers instead of conventional chillers and a water heater when energy prices are high. It is difficult and challenging to determine when and to what extent each of the multiple subplants should be used to minimize energy cost. If electrical demand charges are considered, the optimization is even more complicated.

Thermal energy storage can be used to store energy for later use. When coupled with real-time pricing for electricity and demand charges, thermal energy storage provides a degree of flexibility that can be used to greatly decrease energy costs by shifting production to low cost times or when other electrical loads are lower so that a new peak demand is not set. It is difficult and challenging to integrate thermal energy storage with a central plant having multiple subplants and to optimize the use of thermal energy storage in conjunction with the multiple subplants to minimize energy cost.

SUMMARY

One implementation of the present disclosure is an optimization system for a central plant configured to serve building energy loads. The optimization system includes a processing circuit configured to receive load prediction data indicating building energy loads for a plurality of time steps in an optimization period and utility rate data indicating a price of one or more resources consumed by equipment of the central plant to serve the building energy loads at each of the plurality of time steps. The optimization system further includes a high level optimization module configured to generate an objective function that expresses a total monetary cost of operating the central plant over the optimization period as a function of the utility rate data and an amount of the one or more resources consumed by the central plant equipment at each of the plurality of time steps. The high level optimization module is configured to optimize the objective function over the optimization period subject to load equality constraints and capacity constraints on the central plant equipment to determine an optimal distribution of the building energy loads over multiple groups of the central plant equipment at each of the plurality of time steps.

In some embodiments, the high level optimization module uses linear programming to generate and optimize the objective function. The objective function may include a cost vector having cost variables representing a monetary cost associated with each of the one or more resources consumed by the central plant equipment to serve the building energy loads at each of the plurality of time steps. The objective function may further include a decision matrix comprising load variables representing an energy load for each of the multiple groups of the central plant equipment at each of the plurality of time steps. The high level optimization module may be configured to determine optimal values for the load variables in the decision matrix.

In some embodiments, the central plant includes a plurality of subplants. Each of the multiple groups of the central plant equipment may correspond to one of the plurality of subplants. In some embodiments, the plurality of subplants include at least one of a hot thermal energy storage subplant and a cold thermal energy storage subplant. The thermal energy storage subplants may be configured to store thermal energy generated in one of the plurality of time steps for use in another of the plurality of time steps.

In some embodiments, the high level optimization module is configured to generate a subplant curve for each of the plurality of subplants. Each subplant curve may indicate a relationship between resource consumption and load production for one of the plurality of subplants. The high level optimization module may use the subplant curves to formulate subplant curve constraints and may optimize the objective function subject to the subplant curve constraints. In some embodiments, generating the subplant curve includes at least one of converting a nonlinear subplant curve into a linear subplant curve including one or more piecewise linear segments and converting a non-convex subplant curve into a convex subplant curve. In some embodiments, generating the subplant curve includes receiving an initial subplant curve based on manufacturer data for the group of equipment corresponding to the subplant and updating the initial subplant curve using experimental data from the central plant.

Another implementation of the present disclosure is a cascaded optimization system for a central plant configured to serve building energy loads. The cascaded optimization system includes a central plant controller configured to use dynamic programming to split an optimization problem for the central plant into a high level optimization and a low level optimization, a high level optimization module configured to perform the high level optimization, and a low level optimization module configured to perform the low level optimization. The high level optimization includes determining an optimal distribution of building energy loads over multiple groups of central plant equipment. The low level optimization includes determining optimal operating statuses for individual devices within each of the multiple groups of the central plant equipment.

In some embodiments, the optimal distribution of the building energy loads determined by the high level optimization module optimizes a monetary cost of operating the central plant over an optimization period. The optimal operating statuses determined by the low level optimization module may optimize an amount of energy consumed by each of the multiple groups of the central plant equipment to achieve the optimal distribution of the building energy loads determined by the high level optimization module.

In some embodiments, the low level optimization module is configured to generate a subplant curve for each of the groups of central plant equipment. Each subplant curve may indicate a relationship between resource consumption and load production for one of the groups of central plant equipment. The high level optimization module may be configured to use the subplant curves to formulate subplant curve constraints and to determine the optimal distribution of the building energy loads subject to the subplant curve constraints.

Another implementation of the present disclosure is a method for optimizing cost in a central plant configured to serve building energy loads. The method includes receiving, at a processing circuit of a central plant optimization system, load prediction data indicating building energy loads for a plurality of time steps in an optimization period and utility rate data indicating a price of one or more resources consumed by equipment of the central plant to serve the building energy loads at each of the plurality of time steps. The method further includes generating, by a high level optimization module of the central plant optimization system, an objective function that expresses a total monetary cost of operating the central plant over the optimization period as a function of the utility rate data and an amount of the one or more resources consumed by the central plant equipment at each of the plurality of time steps. The method further includes optimizing, by the high level optimization module, the objective function over the optimization period subject to load equality constraints and capacity constraints on the central plant equipment to determine an optimal distribution of the building energy loads over multiple groups of the central plant equipment at each of the plurality of time steps.

In some embodiments, the high level optimization module uses linear programming to generate and optimize the objective function. The objective function may include a cost vector having cost variables representing a monetary cost associated with each of the one or more resources consumed by the central plant equipment to serve the building energy loads at each of the plurality of time steps. The objective function may further include a decision matrix comprising load variables representing an energy load for each of the multiple groups of the central plant equipment at each of the plurality of time steps. The high level optimization module may be configured to determine optimal values for the load variables in the decision matrix.

In some embodiments, the method includes using the building energy loads and capacity limits for the central plant equipment to generate the load equality constraints and the capacity constraints. The load equality constraints may ensure that the optimal distribution satisfies the building energy loads at each of the plurality of time steps. The capacity constraints may ensure that the multiple groups of central plant equipment are operated within the capacity limits at each of the plurality of time steps.

In some embodiments, the central plant includes a plurality of subplants. Each of the multiple groups of the central plant equipment may correspond to one of the plurality of subplants. In some embodiments, the method includes generating a subplant curve for each of the plurality of subplants. Each subplant curve may indicate a relationship between resource consumption and load production for one of the plurality of subplants. The method may further include using the subplant curves to formulate subplant curve constraints and optimizing the objective function subject to the subplant curve constraints. In some embodiments, generating the subplant curve includes at least one of converting a nonlinear subplant curve into a linear subplant curve including one or more piecewise linear segments and converting a non-convex subplant curve into a convex subplant curve.

In some embodiments, the method further includes using dynamic programming to split the optimization process into a high level optimization and a low level optimization. The high level optimization may include determining the optimal distribution of the building energy loads over the multiple groups of the central plant equipment. In some embodiments, the optimal distribution of the building energy loads optimizes the monetary cost of operating the central plant over the optimization period. The low level optimization may include determining optimal operating statuses for individual devices within each of the multiple groups of the central plant equipment. In some embodiments, the optimal operating statuses optimize an amount of energy consumed by each of the multiple groups of the central plant equipment to achieve the optimal distribution of the building energy loads.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
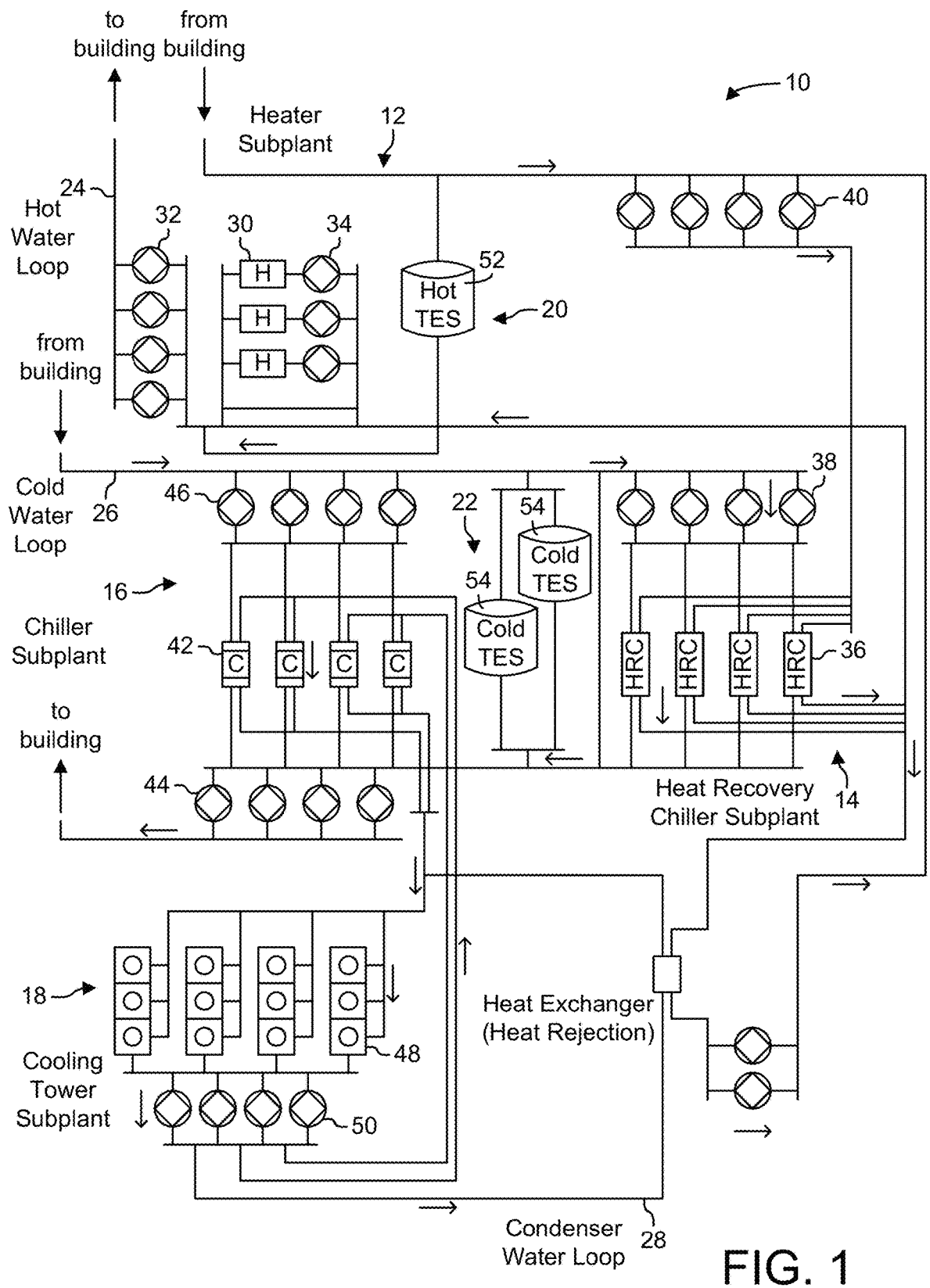
FIG. 1 is a schematic diagram of a central plant having a plurality of subplants including a heater subplant, heat recovery chiller subplant, a chiller subplant, a hot thermal energy storage subplant, and a cold thermal energy storage subplant, according to an exemplary embodiment.

Referring generally to the FIGURES, systems and methods for optimizing a central plant are shown, according to an exemplary embodiment. A central plant may include may include various types of equipment configured to serve the thermal energy loads of a building or campus (i.e., a system of buildings). For example, a central plant may include heaters, chillers, heat recovery chillers, cooling towers, or other types of equipment configured to provide heating or cooling for the building or campus. The central plant equipment may be divided into various groups configured to perform a particular function. Such groups of central plant equipment are referred to herein as subplants. For example, a central plant may include a heater subplant, a chiller subplant, a heat recovery chiller subplant, a cold thermal energy storage subplant, a hot thermal energy storage subplant, etc. The subplants may consume resources from one or more utilities (e.g., water, electricity, natural gas, etc.) to serve the energy loads of the building or campus. Optimizing the central plant may include operating the various subplants in such a way that results in a minimum monetary cost to serve the building energy loads.

In some embodiments, the central plant optimization is a cascaded optimization process including a high level optimization and a low level optimization. The high level optimization may determine an optimal distribution of energy loads across the various subplants. For example, the high level optimization may determine a thermal energy load to be produced by each of the subplants at each time element in an optimization period. In some embodiments, the high level optimization includes optimizing a high level cost function that expresses the monetary cost of operating the subplants as a function of the resources consumed by the subplants at each time element of the optimization period. The low level optimization may use the optimal load distribution determined by the high level optimization to determine optimal operating statuses for individual devices within each subplant. Optimal operating statuses may include, for example, on/off states and/or operating setpoints for individual devices of each subplant. The low level optimization may include optimizing a low level cost function that expresses the energy consumption of a subplant as a function of the on/off states and/or operating setpoints for the individual devices of the subplant.

The present disclosure focuses on the high level optimization and describes systems and methods for performing the high level optimization. A high level optimization module may perform the high level optimization. In various embodiments, the high level optimization module may be a component of a central plant controller configured for real-time control of a physical plant or a component of a planning tool configured to optimize a simulated plant (e.g., for planning or design purposes).

In some embodiments, the high level optimization module uses a linear programming framework to perform the high level optimization. Advantageously, linear programming can efficiently handle complex optimization scenarios and can optimize over a relatively long optimization period (e.g., days, weeks, years, etc.) in a relatively short timeframe (e.g., seconds, milliseconds, etc.). In other embodiments, the high level optimization module may use any of a variety of other optimization frameworks (e.g., quadratic programming, linear-fractional programming, nonlinear programming, combinatorial algorithms, etc.).

An objective function defining the high level optimization problem can be expressed in the linear programming framework as:

$$\operatorname*{argmin}_{x} c^T x; \text{ subject to } Ax \leq b, Hx = g$$

where c is a cost vector, x is a decision matrix, A and b are a matrix and vector (respectively) which describe inequality constraints on the variables in the decision matrix x, and H and g are a matrix and vector (respectively) which describe equality constraints on the variables in the decision matrix x. The variables in the decision matrix x may include the subplant loads assigned to the various subplants and/or an amount of resource consumption by the subplants at each time element in the optimization period. The high level optimization module may define the cost vector c and the optimization constraints (e.g., the matrices A and H and the vectors b and g) and solve the optimization problem to determine optimal subplant load values for the variables in the decision matrix x.

The high level optimization module may receive, as an input, predicted or planned energy loads for the building or campus for each of the time elements in the optimization period. The high level optimization module may use the predicted or planned loads to formulate the constraints on the high level optimization problem (e.g., to define the matrices A and H and the vectors b and g). The high level optimization module may also receive utility rates (e.g., energy prices, water prices, demand charges, etc.) defining the cost of each resource consumed by the central plant to serve the energy loads. The utility rates may be time-variable rates (e.g., defining a different rates at different times) and may include demand charges for various time periods. The high level optimization module may use the utility rates to define the cost vector c.

The high level optimization module may receive or generate subplant curves for each of the subplants. A subplant curve defines the resource consumption of a subplant as a function of the load produced by the subplant. The subplant curves may be generated by a low level optimization module or by the high level optimization module based on operating data points received from the low level optimization module. The high level optimization module may use the subplant curves to constrain the resource consumption of each subplant to a value along the corresponding subplant curve (e.g., based on the load produced by the subplant). For example, the high level optimization module may use the subplant curves to define the optimization constraints (e.g., the matrices A and H and the vectors b and g) on the high level optimization problem.

In some embodiments, the high level optimization module is configured to incorporate a demand charge into the high level optimization process. The demand charge is an additional charge imposed by some utility providers based on the maximum rate of resource consumption during an applicable demand charge period. For example, an electric demand charge may be provided as a cost $c_{demand}$ per unit power and may be multiplied by the peak electricity usage max ($P_{elec,k}$) during a demand charge period to determine the demand charge. Conventional systems have been unable to incorporate a demand charge into a linear optimization framework due to the nonlinear max ( ) function used to calculate the demand charge.

Advantageously, the high level optimization module of the present disclosure may be configured to incorporate the demand charge into the linear optimization framework by modifying the decision matrix x, the cost vector c, and/or the A matrix and the b vector which describe the inequality constraints. For example, the high level optimization module may modify the decision matrix x by adding a new decision variable $x_{peak}$ representing the peak power consumption within the optimization period. The high level optimization module may modify the cost vector c with the demand charge rate $c_{demand}$ such that the demand charge rate $c_{demand}$ is multiplied by the peak power consumption $x_{peak}$. The high level optimization module may generate and/or impose constraints to ensure that the peak power consumption $x_{peak}$ is greater than or equal to the electric demand for each time step in the demand charge period and greater than or equal to its previous value during the demand charge period.

In some embodiments, the high level optimization module is configured to incorporate a load change penalty into the high level optimization process. The load change penalty may represent an increased cost (e.g., equipment degradation, etc.) resulting from a rapid change in the load assigned to a subplant. The high level optimization module may incorporate the load change penalty by modifying the decision matrix x, the cost vector c, and/or the optimization constraints. For example, the high level optimization module may modify the decision matrix x by adding load change variables δ for each subplant. The load change variables may represent the change in subplant load for each subplant from one time element to the next. The high level optimization module may modify the cost vector c to add a cost associated with changing the subplant loads. In some embodiments, the high level optimization module adds constraints that constrain the load change variables δ to the corresponding change in the subplant load. These and other enhancements to the high level optimization process may be incorporated into the linear optimization framework, as described in greater detail below.

Referring now to FIG. 1, a diagram of a central plant 10 is shown, according to an exemplary embodiment. Central plant 10 is shown to include a plurality of subplants including a heater subplant 12, a heat recovery chiller subplant 14, a chiller subplant 16, a cooling tower subplant 18, a hot thermal energy storage (TES) subplant 20, and a cold thermal energy storage (TES) subplant 22. Subplants 12-22 consume resources (e.g., water, natural gas, electricity, etc.) from utilities to serve the thermal energy loads (e.g., hot water, cold water, heating, cooling, etc.) of a building or campus. For example, heater subplant 12 may be configured to heat water in a hot water loop 24 that circulates the hot water between central plant 10 and a building (not shown). Chiller subplant 16 may be configured to chill water in a cold water loop 26 that circulates the cold water between central plant 10 and the building. Heat recovery chiller subplant 14 may be configured to transfer heat from cold water loop 26 to hot water loop 24 to provide additional heating for the hot water and additional cooling for the cold water. Condenser water loop 28 may absorb heat from the cold water in chiller subplant 16 and reject the absorbed heat in cooling tower subplant 18 or transfer the absorbed heat to hot water loop 24. Hot TES subplant 20 and cold TES subplant 22 store hot and cold thermal energy, respectively, for subsequent use.

Hot water loop 24 and cold water loop 26 may deliver the heated and/or chilled water to air handlers located on the rooftop of a building or to individual floors or zones of the building. The air handlers push air past heat exchangers (e.g., heating coils or cooling coils) through which the water flows to provide heating or cooling for the air. The heated or cooled air may be delivered to individual zones of the building to serve the thermal energy loads of the building. The water then returns to central plant 10 to receive further heating or cooling in subsystems 12-22.

Although central plant 10 is shown and described as heating and cooling water for circulation to a building, it is understood that any other type of working fluid (e.g., glycol, CO2, etc.) may be used in place of or in addition to water to serve the thermal energy loads. In other embodiments, central plant 10 may provide heating and/or cooling directly to the building or campus without requiring an intermediate heat transfer fluid. Central plant 10 may be physically separate from a building served by subplants 12-22 or physically integrated with the building (e.g., located within the building).

Each of subplants 12-22 may include a variety of equipment configured to facilitate the functions of the subplant. For example, heater subplant 12 is shown to include a plurality of heating elements 30 (e.g., boilers, electric heaters, etc.) configured to add heat to the hot water in hot water loop 24. Heater subplant 12 is also shown to include several pumps 32 and 34 configured to circulate the hot water in hot water loop 24 and to control the flow rate of the hot water through individual heating elements 30. Heat recovery chiller subplant 14 is shown to include a plurality of heat recovery heat exchangers 36 (e.g., refrigeration circuits) configured to transfer heat from cold water loop 26 to hot water loop 24. Heat recovery chiller subplant 14 is also shown to include several pumps 38 and 40 configured to circulate the hot water and/or cold water through heat recovery heat exchangers 36 and to control the flow rate of the water through individual heat recovery heat exchangers 36.

Chiller subplant 16 is shown to include a plurality of chillers 42 configured to remove heat from the cold water in cold water loop 26. Chiller subplant 16 is also shown to include several pumps 44 and 46 configured to circulate the cold water in cold water loop 26 and to control the flow rate of the cold water through individual chillers 42. Cooling tower subplant 18 is shown to include a plurality of cooling towers 48 configured to remove heat from the condenser water in condenser water loop 28. Cooling tower subplant 18 is also shown to include several pumps 50 configured to circulate the condenser water in condenser water loop 28 and to control the flow rate of the condenser water through individual cooling towers 48.

Hot TES subplant 20 is shown to include a hot TES tank 52 configured to store the hot water for later use. Hot TES subplant 20 may also include one or more pumps or valves configured to control the flow rate of the hot water into or out of hot TES tank 52. Cold TES subplant 22 is shown to include cold TES tanks 54 configured to store the cold water for later use. Cold TES subplant 22 may also include one or more pumps or valves configured to control the flow rate of the cold water into or out of cold TES tanks 54. In some embodiments, one or more of the pumps in central plant 10 (e.g., pumps 32, 34, 38, 40, 44, 46, and/or 50) or pipelines in central plant 10 includes an isolation valve associated therewith. In various embodiments, isolation valves may be integrated with the pumps or positioned upstream or downstream of the pumps to control the fluid flows in central plant 10. In other embodiments, more, fewer, or different types of devices may be included in central plant 10.

Figure 2:
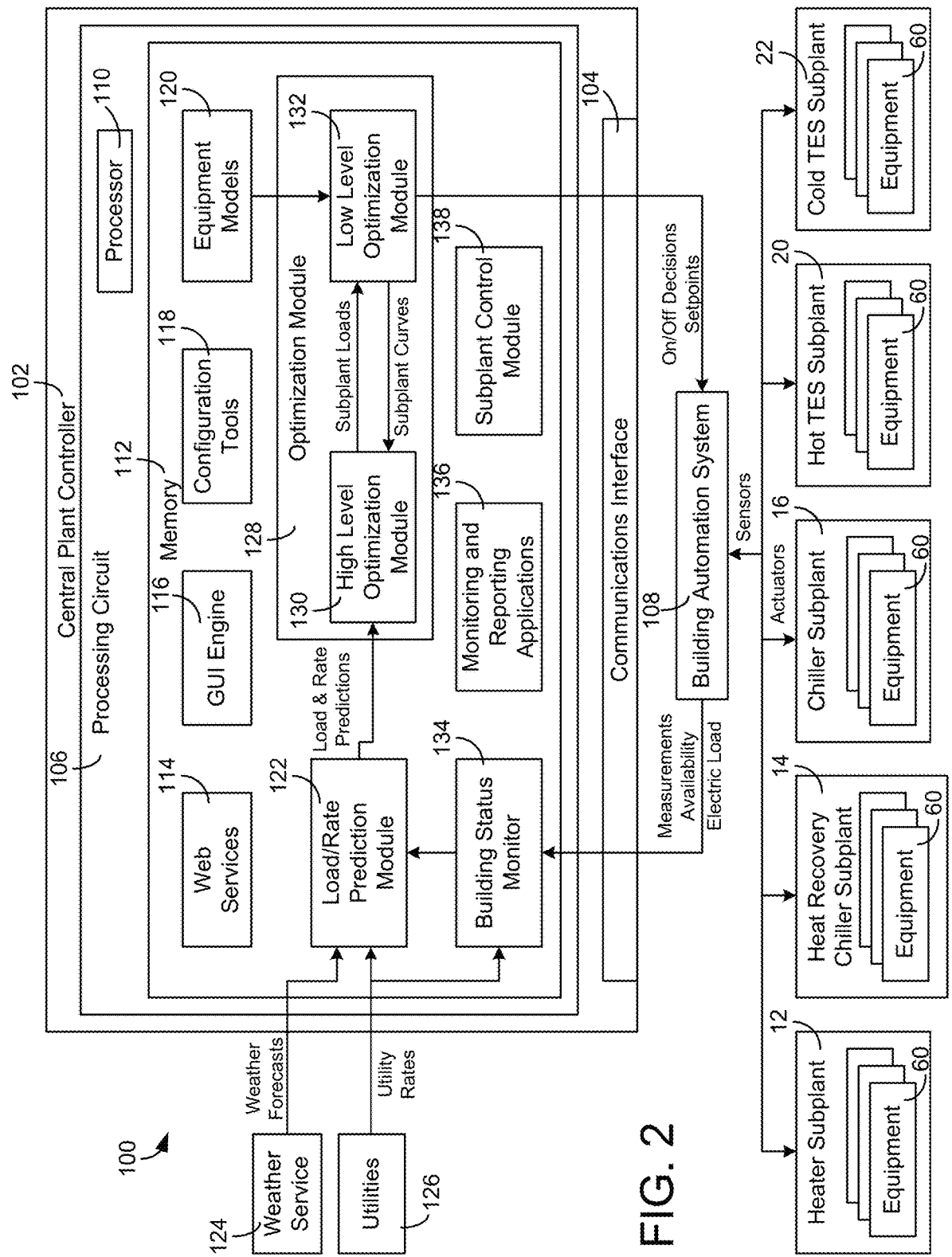
FIG. 2 is a block diagram illustrating a central plant system including a central plant controller that may be used to control the central plant of FIG. 1, according to an exemplary embodiment.

Referring now to FIG. 2, a block diagram illustrating a central plant system 100 is shown, according to an exemplary embodiment. System 100 is shown to include a central plant controller 102, a building automation system 108, and a plurality of subplants 12-22. Subplants 12-22 may be the same as previously described with reference to FIG. 1. For example, subplants 12-22 are shown to include a heater subplant 12, a heat recovery chiller subplant 14, a chiller subplant 16, a hot TES subplant 20, and a cold TES subplant 22.

Each of subplants 12-22 is shown to include equipment 60 that can be controlled by central plant controller 102 and/or building automation system 108 to optimize the performance of central plant 10. Equipment 60 may include, for example, heating devices 30, chillers 42, heat recovery heat exchangers 36, cooling towers 48, thermal energy storage devices 52, 54, pumps 32, 44, 50, valves 34, 38, 46, and/or other devices of subplants 12-22. Individual devices of equipment 60 can be turned on or off to adjust the thermal energy load served by each of subplants 12-22. In some embodiments, individual devices of equipment 60 can be operated at variable capacities (e.g., operating a chiller at 10% capacity or 60% capacity) according to an operating setpoint received from central plant controller 102.

In some embodiments, one or more of subplants 12-22 includes a subplant level controller configured to control the equipment 60 of the corresponding subplant. For example, central plant controller 102 may determine an on/off configuration and global operating setpoints for equipment 60. In response to the on/off configuration and received global operating setpoints, the subplant controllers may turn individual devices of equipment 60 on or off, and implement specific operating setpoints (e.g., damper position, vane position, fan speed, pump speed, etc.) to reach or maintain the global operating setpoints.

Building automation system (BAS) 108 may be configured to monitor conditions within a controlled building or building zone. For example, BAS 108 may receive input from various sensors (e.g., temperature sensors, humidity sensors, airflow sensors, voltage sensors, etc.) distributed throughout the building and may report building conditions to central plant controller 102. Building conditions may include, for example, a temperature of the building or a zone of the building, a power consumption (e.g., electric load) of the building, a state of one or more actuators configured to affect a controlled state within the building, or other types of information relating to the controlled building. BAS 108 may operate subplants 12-22 to affect the monitored conditions within the building and to serve the thermal energy loads of the building.

BAS 108 may receive control signals from central plant controller 102 specifying on/off states and/or setpoints for equipment 60. BAS 108 may control equipment 60 (e.g., via actuators, power relays, etc.) in accordance with the control signals provided by central plant controller 102. For example, BAS 108 may operate equipment 60 using closed loop control to achieve the setpoints specified by central plant controller 102. In various embodiments, BAS 108 may be combined with central plant controller 102 or may be part of a separate building management system. According to an exemplary embodiment, BAS 108 is a METASYS® brand building management system, as sold by Johnson Controls, Inc.

Central plant controller 102 may monitor the status of the controlled building using information received from BAS 108. Central plant controller 102 may be configured to predict the thermal energy loads (e.g., heating loads, cooling loads, etc.) of the building for plurality of time steps in a prediction window (e.g., using weather forecasts from a weather service). Central plant controller 102 may generate on/off decisions and/or setpoints for equipment 60 to minimize the cost of energy consumed by subplants 12-22 to serve the predicted heating and/or cooling loads for the duration of the prediction window. Central plant controller 102 may be configured to carry out process 1100 (FIG. 11) and other processes described herein. According to an exemplary embodiment, central plant controller 102 is integrated within a single computer (e.g., one server, one housing, etc.). In various other exemplary embodiments, central plant controller 102 can be distributed across multiple servers or computers (e.g., that can exist in distributed locations). In another exemplary embodiment, central plant controller 102 may be integrated with a smart building manager that manages multiple building systems and/or combined with BAS 108.

Central plant controller 102 is shown to include a communications interface 104 and a processing circuit 106. Communications interface 104 may include wired or wireless interfaces (e.g., jacks, antennas, transmitters, receivers, transceivers, wire terminals, etc.) for conducting data communications with various systems, devices, or networks. For example, communications interface 104 may include an Ethernet card and port for sending and receiving data via an Ethernet-based communications network and/or a WiFi transceiver for communicating via a wireless communications network. Communications interface 104 may be configured to communicate via local area networks or wide area networks (e.g., the Internet, a building WAN, etc.) and may use a variety of communications protocols (e.g., BACnet, IP, LON, etc.).

Communications interface 104 may be a network interface configured to facilitate electronic data communications between central plant controller 102 and various external systems or devices (e.g., BAS 108, subplants 12-22, etc.). For example, central plant controller 102 may receive information from BAS 108 indicating one or more measured states of the controlled building (e.g., temperature, humidity, electric loads, etc.) and one or more states of subplants 12-22 (e.g., equipment status, power consumption, equipment availability, etc.). Communications interface 104 may receive inputs from BAS 108 and/or subplants 12-22 and may provide operating parameters (e.g., on/off decisions, setpoints, etc.) to subplants 12-22 via BAS 108. The operating parameters may cause subplants 12-22 to activate, deactivate, or adjust a setpoint for various devices of equipment 60.

Still referring to FIG. 2, processing circuit 106 is shown to include a processor 110 and memory 112. Processor 110 may be a general purpose or specific purpose processor, an application specific integrated circuit (ASIC), one or more field programmable gate arrays (FPGAs), a group of processing components, or other suitable processing components. Processor 110 may be configured to execute computer code or instructions stored in memory 112 or received from other computer readable media (e.g., CDROM, network storage, a remote server, etc.).

Memory 112 may include one or more devices (e.g., memory units, memory devices, storage devices, etc.) for storing data and/or computer code for completing and/or facilitating the various processes described in the present disclosure. Memory 112 may include random access memory (RAM), read-only memory (ROM), hard drive storage, temporary storage, non-volatile memory, flash memory, optical memory, or any other suitable memory for storing software objects and/or computer instructions. Memory 112 may include database components, object code components, script components, or any other type of information structure for supporting the various activities and information structures described in the present disclosure. Memory 112 may be communicably connected to processor 110 via processing circuit 106 and may include computer code for executing (e.g., by processor 106) one or more processes described herein.

Still referring to FIG. 2, memory 112 is shown to include a building status monitor 134. Central plant controller 102 may receive data regarding the overall building or building space to be heated or cooled with central plant 10 via building status monitor 134. In an exemplary embodiment, building status monitor 134 may include a graphical user interface component configured to provide graphical user interfaces to a user for selecting building requirements (e.g., overall temperature parameters, selecting schedules for the building, selecting different temperature levels for different building zones, etc.).

Central plant controller 102 may determine on/off configurations and operating setpoints to satisfy the building requirements received from building status monitor 134. In some embodiments, building status monitor 134 receives, collects, stores, and/or transmits cooling load requirements, building temperature setpoints, occupancy data, weather data, energy data, schedule data, and other building parameters. In some embodiments, building status monitor 134 stores data regarding energy costs, such as pricing information available from utilities 126 (energy charge, demand charge, etc.).

Still referring to FIG. 2, memory 112 is shown to include a load/rate prediction module 122. Load/rate prediction module 122 may be configured to predict the thermal energy loads ($\hat{\ell}_k$) of the building or campus for each time step k (e.g., k=1 . . . n) of an optimization period. Load/rate prediction module 122 is shown receiving weather forecasts from a weather service 124. In some embodiments, load/rate prediction module 122 predicts the thermal energy loads $\hat{\ell}_k$ as a function of the weather forecasts. In some embodiments, load/rate prediction module 122 uses feedback from BAS 108 to predict loads $\hat{\ell}_k$. Feedback from BAS 108 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate prediction module 122 receives a measured electric load and/or previous measured load data from BAS 108 (e.g., via building status monitor 134). Load/rate prediction module 122 may predict loads $\hat{\ell}_k$ as a function of a given weather forecast ($\hat{\phi}_w$), a day type (day), the time of day (t), and previous measured load data ($Y_{k-1}$). Such a relationship is expressed in the following equation:

$$\hat{\ell}_k = f(\hat{\phi}_w, \text{day}, t | Y_{k-1})$$

In some embodiments, load/rate prediction module 122 uses a deterministic plus stochastic model trained from historical load data to predict loads $\hat{\ell}_k$. Load/rate prediction module 122 may use any of a variety of prediction methods to predict loads $\hat{\ell}_k$ (e.g., linear regression for the deterministic portion and an AR model for the stochastic portion). Load/rate prediction module 122 may predict one or more different types of loads for the building or campus. For example, load/rate prediction module 122 may predict a hot water load $\hat{\ell}_{Hot,k}$ and a cold water load $\hat{\ell}_{Cold,k}$ for each time step k within the prediction window.

Load/rate prediction module 122 is shown receiving utility rates from utilities 126. Utility rates may indicate a cost or price per unit of a resource (e.g., electricity, natural gas, water, etc.) provided by utilities 126 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 126 or predicted utility rates estimated by load/rate prediction module 122.

In some embodiments, the utility rates include demand charges for one or more resources provided by utilities 126. A demand charge may define a separate cost imposed by utilities 126 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, optimization module 128 may be configured to account for demand charges in the high level optimization process performed by high level optimization module 130. Utilities 126 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period.

Load/rate prediction module 122 may store the predicted loads $\hat{\ell}_k$ and the utility rates in memory 112 and/or provide the predicted loads $\hat{\ell}_k$ and the utility rates to optimization module 128. Optimization module 128 may use the predicted loads $\hat{\ell}_k$ and the utility rates to determine an optimal load distribution for subplants 12-22 and to generate on/off decisions and setpoints for equipment 60.

Still referring to FIG. 2, memory 112 is shown to include an optimization module 128. Optimization module 128 may perform a cascaded optimization process to optimize the performance of central plant 10. For example, optimization module 128 is shown to include a high level optimization module 130 and a low level optimization module 132. High level optimization module 130 may control an outer (e.g., subplant level) loop of the cascaded optimization. High level optimization module 130 may determine an optimal distribution of thermal energy loads across subplants 12-22 for each time step in the prediction window in order to optimize (e.g., minimize) the cost of energy consumed by subplants 12-22. Low level optimization module 132 may control an inner (e.g., equipment level) loop of the cascaded optimization. Low level optimization module 132 may determine how to best run each subplant at the load setpoint determined by high level optimization module 130. For example, low level optimization module 132 may determine on/off states and/or operating setpoints for various devices of equipment 60 in order to optimize (e.g., minimize) the energy consumption of each subplant while meeting the thermal energy load setpoint for the subplant. The cascaded optimization process is described in greater detail with reference to FIG. 3.

Still referring to FIG. 2, memory 112 is shown to include a subplant control module 138. Subplant control module 138 may store historical data regarding past operating statuses, past operating setpoints, and instructions for calculating and/or implementing control parameters for subplants 12-22. Subplant control module 138 may also receive, store, and/or transmit data regarding the conditions of individual devices of equipment 60, such as operating efficiency, equipment degradation, a date since last service, a lifespan parameter, a condition grade, or other device-specific data. Subplant control module 138 may receive data from subplants 12-22 and/or BAS 108 via communications interface 104. Subplant control module 138 may also receive and store on/off statuses and operating setpoints from low level optimization module 132.

Data and processing results from optimization module 128, subplant control module 138, or other modules of central plant controller 102 may be accessed by (or pushed to) monitoring and reporting applications 136. Monitoring and reporting applications 136 may be configured to generate real time "system health" dashboards that can be viewed and navigated by a user (e.g., a central plant engineer). For example, monitoring and reporting applications 136 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across central plants in different buildings (real or modeled), different campuses, or the like. Other GUI elements or reports may be generated and shown based on available data that allow users to assess performance across one or more central plants from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the central plant.

Still referring to FIG. 2, central plant controller 102 may include one or more GUI servers, web services 114, or GUI engines 116 to support monitoring and reporting applications 136. In various embodiments, applications 136, web services 114, and GUI engine 116 may be provided as separate components outside of central plant controller 102 (e.g., as part of a smart building manager). Central plant controller 102 may be configured to maintain detailed historical databases (e.g., relational databases, XML, databases, etc.) of relevant data and includes computer code modules that continuously, frequently, or infrequently query, aggregate, transform, search, or otherwise process the data maintained in the detailed databases. Central plant controller 102 may be configured to provide the results of any such processing to other databases, tables, XML files, or other data structures for further querying, calculation, or access by, for example, external monitoring and reporting applications.

Central plant controller 102 is shown to include configuration tools 118. Configuration tools 118 can allow a user to define (e.g., via graphical user interfaces, via prompt-driven "wizards," etc.) how central plant controller 102 should react to changing conditions in the central plant subsystems. In an exemplary embodiment, configuration tools 118 allow a user to build and store condition-response scenarios that can cross multiple central plant devices, multiple building systems, and multiple enterprise control applications (e.g., work order management system applications, entity resource planning applications, etc.). For example, configuration tools 118 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 118 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Figure 3:
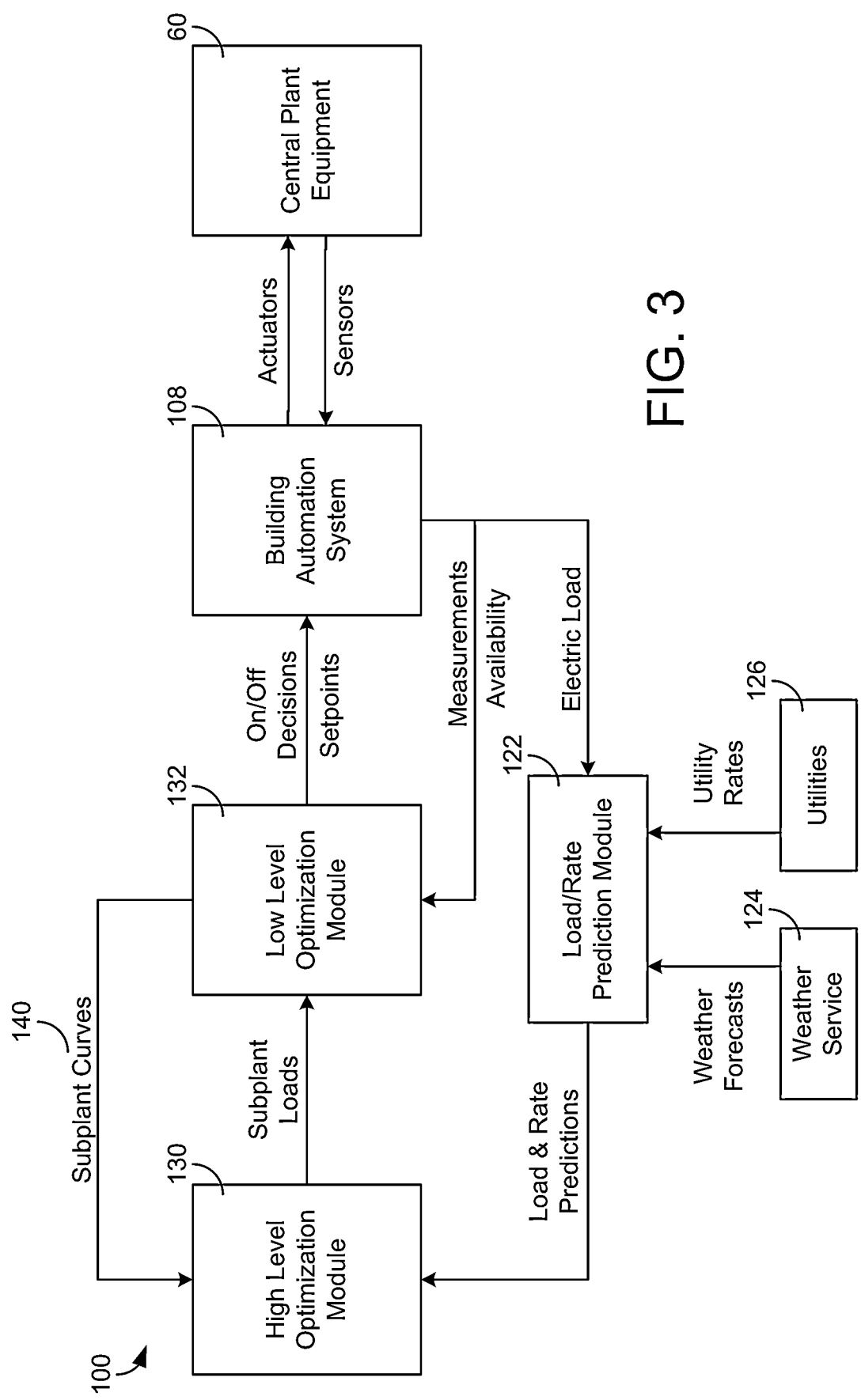
FIG. 3 is block diagram illustrating a portion of central plant system of FIG. 2 in greater detail, showing a load/rate prediction module, a high level optimization module, a low level optimization module, a building automation system, and central plant equipment, according to an exemplary embodiment.

Referring now to FIG. 3, a block diagram illustrating a portion of central plant system 100 in greater detail is shown, according to an exemplary embodiment. FIG. 3 illustrates the cascaded optimization process performed by optimization module 128 to optimize the performance of central plant 10. In the cascaded optimization process, high level optimization module 130 performs a subplant level optimization that determines an optimal distribution of thermal energy loads across subplants 12-22 for each time step in the prediction window in order to minimize the cost of energy consumed by subplants 12-22. Low level optimization module 132 performs an equipment level optimization that determines how to best run each subplant at the subplant load setpoint determined by high level optimization module 130. For example, low level optimization module 132 may determine on/off states and/or operating setpoints for various devices of equipment 60 in order to optimize the energy consumption of each subplant while meeting the thermal energy load setpoint for the subplant.

One advantage of the cascaded optimization process performed by optimization module 128 is the optimal use of computational time. For example, the subplant level optimization performed by high level optimization module 130 may use a relatively long time horizon due to the operation of the thermal energy storage. However, the equipment level optimization performed by low level optimization module 132 may use a much shorter time horizon or no time horizon at all since the low level system dynamics are relatively fast (compared to the dynamics of the thermal energy storage) and the low level control of equipment 60 may be handled by BAS 108. Such an optimal use of computational time makes it possible for optimization module 128 to perform the central plant optimization in a short amount of time, allowing for real-time predictive control. For example, the short computational time enables optimization module 128 to be implemented in a real-time planning tool with interactive feedback.

Another advantage of the cascaded optimization performed by optimization module 128 is that the central plant optimization problem can be split into two cascaded subproblems. The cascaded configuration provides a layer of abstraction that allows high level optimization module 130 to distribute the thermal energy loads across subplants 12-22 without requiring high level optimization module 130 to know or use any details regarding the particular equipment configuration within each subplant. The interconnections between equipment 60 within each subplant may be hidden from high level optimization module 130 and handled by low level optimization module 132. For purposes of the subplant level optimization performed by high level optimization module 130, each subplant may be completely defined by one or more subplant curves 140.

Still referring to FIG. 3, low level optimization module 132 may generate and provide subplant curves 140 to high level optimization module 130. Subplant curves 140 may indicate the rate of utility use by each of subplants 12-22 (e.g., electricity use measured in kW, water use measured in L/s, etc.) as a function of the subplant load. Exemplary subplant curves are shown and described in greater detail with reference to FIGS. 5A-8. In some embodiments, low level optimization module 132 generates subplant curves 140 based on equipment models 120 (e.g., by combining equipment models 120 for individual devices into an aggregate curve for the subplant). Low level optimization module 132 may generate subplant curves 140 by running the low level optimization process for several different loads and weather conditions to generate multiple data points. Low level optimization module 132 may fit a curve to the data points to generate subplant curves 140. In other embodiments, low level optimization module 132 provides the data points to high level optimization module 132 and high level optimization module 132 generates the subplant curves using the data points.

High level optimization module 130 may receive the load and rate predictions from load/rate prediction module 122 and the subplant curves 140 from low level optimization module 132. The load predictions may be based on weather forecasts from weather service 124 and/or information from building automation system 108 (e.g., a current electric load of the building, measurements from the building, a history of previous loads, a setpoint trajectory, etc.). The utility rate predictions may be based on utility rates received from utilities 126 and/or utility prices from another data source. High level optimization module 130 may determine the optimal load distribution for subplants 12-22 (e.g., a subplant load for each subplant) for each time step the prediction window and provide the subplant loads as setpoints to low level optimization module 132. In some embodiments, high level optimization module 130 determines the subplant loads by minimizing the total operating cost of central plant 10 over the prediction window. In other words, given a predicted load and utility rate information from load/rate prediction module 122, high level optimization module 130 may distribute the predicted load across subplants 12-22 over the optimization period to minimize operating cost.

In some instances, the optimal load distribution may include using TES subplants 20 and/or 22 to store thermal energy during a first time step for use during a later time step. Thermal energy storage may advantageously allow thermal energy to be produced and stored during a first time period when energy prices are relatively low and subsequently retrieved and used during a second time period when energy proves are relatively high. The high level optimization may be different from the low level optimization in that the high level optimization has a longer time constant due to the thermal energy storage provided by TES subplants 20-22. The high level optimization may be described by the following equation:

$$\theta_{HL}^* = \underset{\theta_{HL}}{\operatorname{argmin}} J_{HL}(\theta_{HL})$$

where $\theta_{HL}^*$ contains the optimal high level decisions (e.g., the optimal load for each of subplants 12-22) for the entire optimization period and $J_{HL}$ is the high level cost function.

To find the optimal high level decisions $\theta_{HL}^*$, high level optimization module 132 may minimize the high level cost function $J_{HL}$. The high level cost function $J_{HL}$ may be the sum of the economic costs of each utility consumed by each of subplants 12-22 for the duration of the optimization period. In some embodiments, the high level cost function $J_{HL}$ may be described using the following equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right]$$

where $n_h$ is the number of time steps k in the optimization period, $n_s$ is the number of subplants, $t_s$ is the duration of a time step, $c_{jk}$ is the economic cost of utility j at a time step k of the optimization period, and $u_{jik}$ is the rate of use of utility j by subplant i at time step k.

In some embodiments, the cost function $J_{HL}$ includes an additional demand charge term such as:

$$w_d c_{demand} \underset{n_h}{\max}(u_{elec}(\theta_{HL}), u_{max,ele})$$

where $w_d$ is a weighting term, $c_{demand}$ is the demand cost, and the max ( ) term selects the peak electricity use during the applicable demand charge period. Accordingly, the high level cost function $J_{HL}$ may be described by the equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right] + w_d c_{demand} \underset{n_h}{\max}(u_{elec}(\theta_{HL}), u_{max,ele})$$

The decision vector $\theta_{HL}$ may be subject to several constraints. For example, the constraints may require that the subplants not operate at more than their total capacity, that the thermal storage not charge or discharge too quickly or under/over flow for the tank, and that the thermal energy loads for the building or campus are met. These restrictions lead to both equality and inequality constraints on the high level optimization problem, as described in greater detail with reference to FIG. 4.

Still referring to FIG. 3, low level optimization module 132 may use the subplant loads determined by high level optimization module 130 to determine optimal low level decisions $\theta_{LL}^*$ (e.g. binary on/off decisions, flow setpoints, temperature setpoints, etc.) for equipment 60. The low level optimization process may be performed for each of subplants 12-22. Low level optimization module 132 may be responsible for determining which devices of each subplant to use and/or the operating setpoints for such devices that will achieve the subplant load setpoint while minimizing energy consumption. The low level optimization may be described using the following equation:

$$\theta_{LL}^* = \underset{\theta_{LL}}{\text{argmin}} J_{LL}(\theta_{LL})$$

where $\theta_{LL}^*$ contains the optimal low level decisions and $J_{LL}$ is the low level cost function.

To find the optimal low level decisions $\theta_{LL}^*$, low level optimization module 132 may minimize the low level cost function $J_{LL}$. The low level cost function $J_{LL}$ may represent the total energy consumption for all of equipment 60 in the applicable subplant. The low level cost function $J_{LL}$ may be described using the following equation:

$$J_{LL}(\theta_{LL}) = \sum_{j=1}^{N} t_s \cdot b_j \cdot u_j(\theta_{LL})$$

where N is the number of devices of equipment 60 in the subplant, $t_s$ is the duration of a time step, $b_j$ is a binary on/off decision (e.g., 0=off, 1=on), and $u_j$ is the energy used by device j as a function of the setpoint $\theta_{LL}$. Each device may have continuous variables which can be changed to determine the lowest possible energy consumption for the overall input conditions.

Low level optimization module 132 may minimize the low level cost function $J_{LL}$ subject to inequality constraints based on the capacities of equipment 60 and equality constraints based on energy and mass balances. In some embodiments, the optimal low level decisions $\theta_{LL}^*$ are constrained by switching constraints defining a short horizon for maintaining a device in an on or off state after a binary on/off switch. The switching constraints may prevent devices from being rapidly cycled on and off. In some embodiments, low level optimization module 132 performs the equipment level optimization without considering system dynamics. The optimization process may be slow enough to safely assume that the equipment control has reached its steady-state. Thus, low level optimization module 132 may determine the optimal low level decisions $\theta_{LL}^*$ at an instance of time rather than over a long horizon.

Low level optimization module 132 may determine optimum operating statuses (e.g., on or off) for a plurality of devices of equipment 60. According to an exemplary embodiment, the on/off combinations may be determined using binary optimization and quadratic compensation. Binary optimization may minimize a cost function representing the power consumption of devices in the applicable subplant. In some embodiments, non-exhaustive (i.e., not all potential combinations of devices are considered) binary optimization is used. Quadratic compensation may be used in considering devices whose power consumption is quadratic (and not linear). Low level optimization module 132 may also determine optimum operating setpoints for equipment using nonlinear optimization. Nonlinear optimization may identify operating setpoints that further minimize the low level cost function $J_{LL}$. Low level optimization module 132 may provide the on/off decisions and setpoints to building automation system 108 for use in controlling the central plant equipment 60.

In some embodiments, the low level optimization performed by low level optimization module 132 is the same or similar to the low level optimization process described in U.S. patent application Ser. No. 14/634,615 titled "Low Level Central Plant Optimization" and filed on Feb. 27, 2015. The entire disclosure of U.S. patent application Ser. No. 14/634,615 is incorporated by reference herein.

Figure 4:
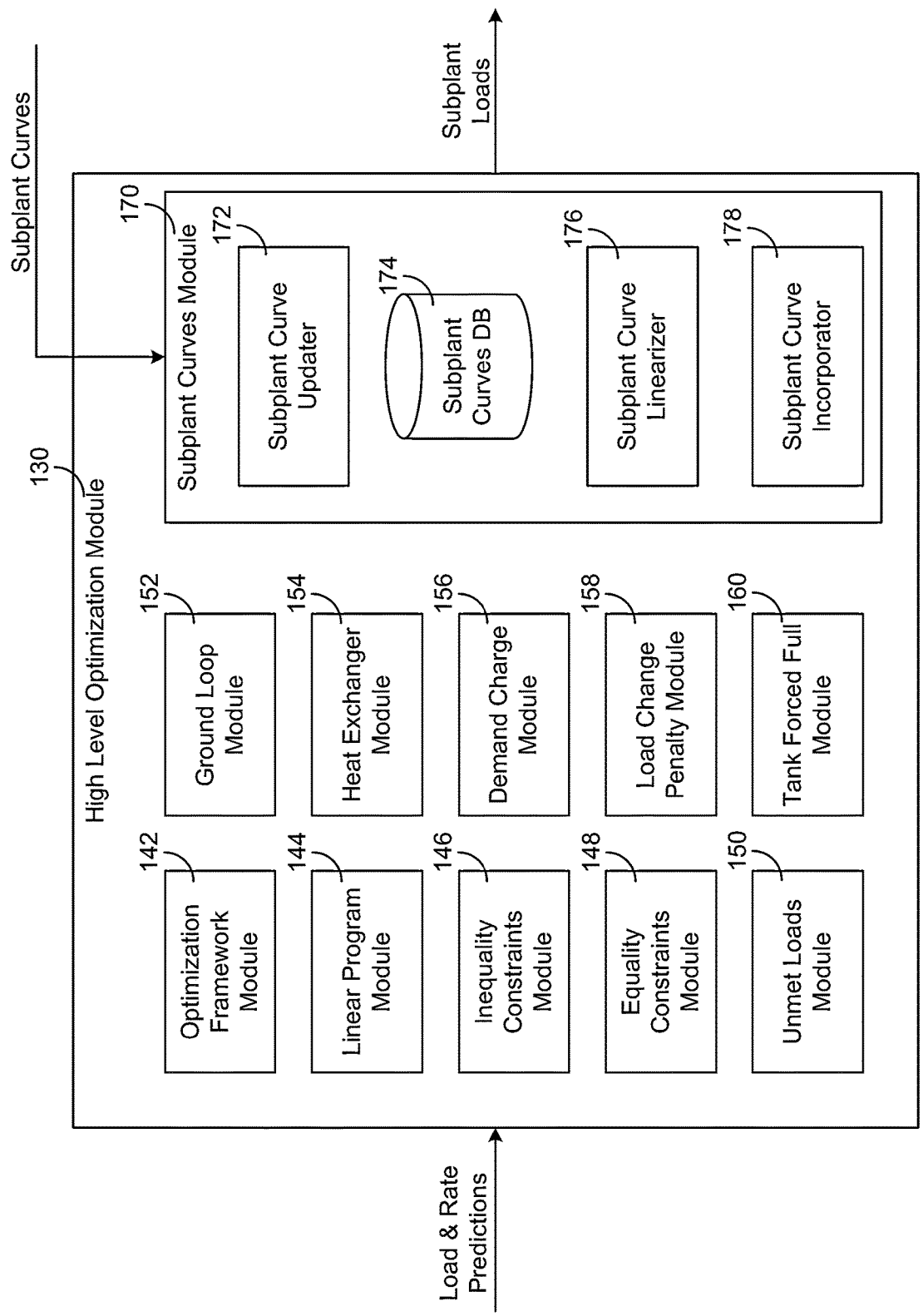
FIG. 4, a block diagram illustrating the high level optimization module of FIG. 3 in greater detail, according to an exemplary embodiment.

Referring now to FIG. 4, a block diagram illustrating high level optimization module 130 in greater detail is shown, according to an exemplary embodiment. High level optimization module 130 may receive load and rate predictions from load/rate prediction module 122 and subplant curves from low level optimization module 132. High level optimization module 130 may determine optimal subplant loads for each of subplants 12-22 as a function of the load and rate predictions and the subplant curves. In some embodiments, the optimal subplant loads minimize the economic cost of operating subplants 12-22 to satisfy the predicted loads for the building or campus. High level optimization module 130 may output the optimal subplant loads to low level optimization module 132.

High level optimization module 130 is shown to include an optimization framework module 142. Optimization framework module 142 may be configured to select and/or establish an optimization framework for use in calculating the optimal subplant loads. In some embodiments, optimization framework module 142 uses linear programming as the optimization framework. A linear programming problem has the following form:

$$\underset{x}{\text{argmin}} c^T x; \text{ subject to } Ax \leq b, Hx = g$$

where c is a cost vector, x is a decision matrix, A and b are a matrix and vector (respectively) which describe inequality constraints on the optimization problem, and H and g are a matrix and vector (respectively) which describe equality constraints on the optimization problem.

The following paragraphs describe an exemplary linear optimization framework that may be used by high level optimization module 130 to calculate the optimal subplant loads. Advantageously, the linear programming framework described herein allows high level optimization module 130 to determine the subplant load distribution for a long optimization period in a very short timeframe complete with load change penalties, demand charges, and subplant performance curves. However, the linear optimization framework is merely one example of an optimization framework that can be used by high level optimization module 130 and should not be regarded as limiting. It should be understood that in other embodiments, high level optimization module 130 may use any of a variety of other optimization frameworks and/or optimization techniques (e.g., quadratic programming, linear-fractional programming, nonlinear programming, combinatorial algorithms, etc.) to calculate the optimal subplant loads.

Still referring to FIG. 4, high level optimization module 130 is shown to include a linear program module 144. Linear program module 144 may be configured to formulate and solve a linear optimization problem to calculate the optimal subplant loads. For example, linear program module 144 may determine and set values for the cost vector c, the A matrix and the b vector which describe the inequality constraints, and the H matrix and the g vector which describe the equality constraints. Linear program module 144 may determine an optimal decision matrix x* that minimizes the cost function $c^T x$. The optimal decision matrix x* may correspond to the optimal decisions $\theta_{HL}$* (for each time step k within an optimization period) that minimize the high level cost function $J_{HL}$, as described with reference to FIG. 3.

For a central plant 10 that includes chillers, heat recovery chillers, hot water generators, and thermal energy storage, the plant assets across which the loads are to be distributed may include a chiller subplant 16, a heat recovery chiller subplant 14, a heater subplant 12, a hot thermal energy storage subplant 20, and a cold thermal energy storage subplant 22. The loads across each of subplants 12-22 may be the decision variables in the decision matrix x that the high level optimization determines for each time step k within the optimization period. For example, linear program module 144 may formulate the decision matrix x as:

$$x = [\dot{Q}_{Chiller,1} \ldots n, \dot{Q}_{hrChiller,1} \ldots n, \dot{Q}_{Heater,1} \ldots n, \dot{Q}_{HotStorage,1} \ldots n, \dot{Q}_{ColdStorage,1} \ldots n]^T$$

where $\dot{Q}_{Chiller,1 \ldots n}$, $\dot{Q}_{hrChiller,1 \ldots n}$, $\dot{Q}_{Heater,1 \ldots n}$, $\dot{Q}_{HotStorage,1 \ldots n}$, and $\dot{Q}_{ColdStorage,1 \ldots n}$ are n-dimensional vectors representing the thermal energy load assigned to chiller subplant 16, heat recovery chiller subplant 14, heater subplant 12, hot TES subplant 20, and cold TES subplant 22, respectively, for each of the n time steps within the optimization period.

Linear program module 144 may formulate the linear program for the simple case where only energy cost and equipment constraints are considered. The simplified linear program may then be modified by inequality constraints module 146, equality constraints module 148, unmet loads module 150, ground loop module 152, heat exchanger module 154, demand charge module 156, load change penalty module 158, tank forced full module 160, and/or subplant curves module 170 to provide additional enhancements, described in greater detail below.

In some embodiments, linear program module 144 formulates the simplified linear program using the assumption that each subplant has a specific cost per unit load. For example, linear program module 144 may assume that each subplant has a constant coefficient of performance (COP) or efficiency for any given time step k. The COP can change over time and may have a different value for different time steps; however, in the simplest case, the COP for each of subplant is not a function of the loading. With this assumption, linear program module 144 may formulate the cost function c as:

$$c = t_s \cdot \left[ \left[ \sum_{j=1}^{n_u} c_j u_{j,Chiller} \right]_{1 \ldots h}, \left[ \sum_{j=1}^{n_u} c_j u_{j,hrChiller} \right]_{1 \ldots h}, \left[ \sum_{j=1}^{n_u} c_j u_{j,Heater} \right]_{1 \ldots h}, 0_h, 0_h \right]^T$$

where $t_s$ is the duration of a time step, $n_u$ is the total number of resources (e.g., electricity, natural gas, water, etc.) consumed by the subplants, $c_j$ is the cost per unit of the jth resource, and $u_{j,Chiller}$, $u_{j,hrChiller}$, and $u_{j,Heater}$ are the usage rates of the jth resource by chiller subplant 16, heat recovery chiller subplant 14, and heater subplant 12, respectively, for each of the h time steps within the optimization period. The first three elements of the form $[\sum_{j=1}^{n_u} c_j u_j]_{1 \ldots h}$ represent vectors of h sums (i.e., summing over all resource use), one for each time step within the optimization period. The last two elements of the form $0_h$ are zero to indicate that charging or discharging the thermal energy storage tanks has no cost (pumping power is neglected).

In some embodiments, linear program module 144 uses the load and rate predictions to formulate the linear program. For example, linear program module 144 may use the load predictions to determine values for $u_{j,Chiller}$, $u_{j,hrChiller}$, and $u_{j,Heater}$ and may use the rate predictions to determine values for $c_j$ for each of the $n_u$ resources. In some embodiments, linear program module 144 uses the subplant curves to define $c_j$ as a function of the resource usage. Linear program module 144 may use inputs from inequality constraints module 146, equality constraints module 148, unmet loads module 150, ground loop module 152, heat exchanger module 154, demand charge module 156, load change penalty module 158, tank forced full module 160, and/or subplant curves module 170 to determine and set values for the various matrices and vectors in the linear program. Modules 146-170 may modify the cost vector c, the A matrix, the b vector, the H matrix, and/or the g vector to provide additional enhancements and/or functionality to the linear program. The inputs provided by modules 146-170 are described in greater detail below.

Linear program module 144 may use any of a variety of linear optimization techniques to solve the linear optimization problem. For example, linear program module 144 may use basis exchange algorithms (e.g., simplex, crisscross, etc.), interior point algorithms (e.g., ellipsoid, projective, path-following, etc.), covering and packing algorithms, integer programming algorithms (e.g., cutting-plant, branch and bound, branch and cut, branch and price, etc.), or any other type of linear optimization algorithm or technique to solve the linear program subject to the optimization constraints. For embodiments in which nonlinear optimization is used, linear program module 144 may use any of a variety of nonlinear optimization techniques to solve the nonlinear optimization problem.

Still referring to FIG. 4, high level optimization module 130 is shown to include an inequality constraints module 146. Inequality constraints module 146 may formulate or define one or more inequality constraints on the optimization problem solved by linear program module 144. In some instances, inequality constraints module 146 defines inequality constraints on the decision variables $\dot{Q}_{Chiller,k}$, $\dot{Q}_{hrChiller,k}$, and $\dot{Q}_{Heater,k}$ corresponding to the loads on chiller subplant 16, heat recovery chiller subplant 14, and heater subplant 12, respectively, for each time step k within optimization period. For example, each of subplants 12-16 may have two capacity constraints given by the following equations:

$$\dot{Q}_{i,k} \leq \dot{Q}_{i,max} \forall k \in \text{horizon}$$

$$\dot{Q}_{i,k} \geq 0 \forall k \in \text{horizon}$$

where $\dot{Q}_{i,k}$ is the load on the ith subplant during time step k and $\dot{Q}_{i,max}$ is the maximum capacity of the ith subplant. The first capacity constraint requires the load $\dot{Q}_{i,k}$ on each of subplants 12-16 to be less than or equal to the maximum capacity $\dot{Q}_{i,max}$ of the subplant for each time step k within the optimization period. The second capacity constraint requires the load $\dot{Q}_{i,k}$ on each of subplants 12-16 to be greater than or equal to zero for each time step k within the optimization period.

The inequality constraints for chiller subplant 16 can be placed in the form $Ax \leq b$ by defining the A matrix and the b vector as follows:

$$A = \begin{bmatrix} [I_h] & [0_h] & [0_h] & [0_h] & [0_h] \\ [-I_h] & [0_h] & [0_h] & [0_h] & [0_h] \end{bmatrix},$$

$$b = \begin{bmatrix} \dot{Q}_{Chiller,max}[I_h] \\ [0_h] \end{bmatrix}$$

where $[I_h]$ represents either an h by h identity matrix or an h by 1 ones vector, $[0_h]$ represents either an h by h zero matrix or an h by 1 zero vector, and $\dot{Q}_{Chiller,max}$ is the maximum capacity of chiller subplant 16. Similar inequality constraints for heat recovery chiller subplant 14 and heater subplant 12 can be placed in the form $Ax \leq b$ by defining the A matrices and the b vectors as follows:

$$A = \begin{bmatrix} [0_h] & [I_h] & [0_h] & [0_h] & [0_h] \\ [0_h] & [-I_h] & [0_h] & [0_h] & [0_h] \end{bmatrix}, b = \begin{bmatrix} \dot{Q}_{hrChiller,max}[I_h] \\ [0_h] \end{bmatrix}$$

$$A = \begin{bmatrix} [0_h] & [0_h] & [I_h] & [0_h] & [0_h] \\ [0_h] & [0_h] & [-I_h] & [0_h] & [0_h] \end{bmatrix}, b = \begin{bmatrix} \dot{Q}_{Heater,max}[I_h] \\ [0_h] \end{bmatrix}$$

where $\dot{Q}_{hrChiller,max}$ is the maximum capacity of heat recovery chiller subplant 14 and $\dot{Q}_{Heater,max}$ is the maximum capacity of heater subplant 12.

Inequality constraints module 146 may formulate or define inequality constraints on the decision variables $\dot{Q}_{HotStorage,k}$ and $\dot{Q}_{ColdStorage,k}$ corresponding to the loads on hot TES subplant 20 and cold TES subplant 22 for each time step k within the optimization period. For example, each of subplants 20-22 may have two capacity constraints given by the following equations:

$$\dot{Q}_{i,k} \leq \dot{Q}_{discharge,i,max} \forall k \in \text{horizon}$$

$$-\dot{Q}_{i,k} \leq \dot{Q}_{charge,i,max} \forall k \in \text{horizon}$$

where $\dot{Q}_{i,k}$ is the rate at which ith TES subplant is being discharged at time step k, $\dot{Q}_{discharge,i,k}$ is the maximum discharge rate of the ith subplant, and $\dot{Q}_{charge,i,k}$ is the maximum charge rate of the ith subplant. Positive load values for $\dot{Q}_{i,k}$ indicate that the TES subplant is discharging and negative load values for $\dot{Q}_{i,k}$ indicate that the subplant is charging. The first capacity constraint requires the discharge rate $\dot{Q}_{i,k}$ for each of subplants 20-22 to be less than or equal to the maximum discharge rate $\dot{Q}_{discharge,i,max}$ of the subplant for each time step k within the optimization period. The second capacity constraint requires the negative discharge rate $-\dot{Q}_{i,k}$ (i.e., the charge rate) for each of subplants 20-22 to be less than or equal to the maximum charge rate $\dot{Q}_{charge,i,max}$ of the subplant for each time step k within the optimization period.

The inequality constraints for hot TES subplant 20 can be placed in the form $Ax \leq b$ by defining the A matrix and the b vector as follows:

$$A = \begin{bmatrix} [0_h] & [0_h] & [0_h] & [I_h] & [0_h] \\ [0_h] & [0_h] & [0_h] & [-I_h] & [0_h] \end{bmatrix}, b = \begin{bmatrix} \dot{Q}_{HotDischarge,max}[I_h] \\ \dot{Q}_{HotCharge,max}[I_h] \end{bmatrix}$$

where $\dot{Q}_{HotDischarge,max}$ is the maximum discharge rate for hot TES subplant 20 and $\dot{Q}_{HotDischarge,max}$ is the maximum charge rate for hot TES subplant 20. Similar inequality constraints for cold TES subplant 22 can be placed in the form $Ax \leq b$ by defining the A matrix and the b vector as follows:

$$A = \begin{bmatrix} [0_h] & [0_h] & [0_h] & [0_h] & [I_h] \\ [0_h] & [0_h] & [0_h] & [0_h] & [-I_h] \end{bmatrix}, b = \begin{bmatrix} \dot{Q}_{ColdDischarge,max}[I_h] \\ \dot{Q}_{ColdCharge,max}[I_h] \end{bmatrix}$$

where $\dot{Q}_{ColdDischarge,max}$ is the maximum discharge rate for cold TES subplant 22 and $\dot{Q}_{ColdDischarge,max}$ is the maximum charge rate for cold TES subplant 22.

Inequality constraints module 146 may implement an electrical demand constraint for the total electrical usage of all the subplants and the building/campus $P_{elec,campus}$. Inequality constraints module 146 may require that the total electrical demand be less than or equal to a maximum electrical demand $P_{elec,max}$ by defining the A matrix and the b vector as follows:

$$A = [u_{elec,Chiller}[I_h], u_{elec,hrChiller}[I_h], u_{elec,Heater}[I_h], 0_n, 0_n] b = P_{elec,max}[I_h] - P_{elec,campus,k}$$

where $u_{elec,Chiller}$, $u_{elec,hrChiller}$, and $u_{elec,Heater}$ are the electrical usage values for chiller subplant 16, heat recovery chiller subplant 14, and heater subplant 12, respectively, $P_{elec,campus,k}$ is the electrical usage of the building/campus at time k, and $P_{elec,max}$ is the maximum total electrical usage for central plant 10 and the building/campus.

Inequality constraints module 146 may implement tank capacity constraints for hot TES subplant 20 and cold TES subplant 22. The tank capacity constraints may require that each TES tank never charge above its maximum capacity or discharge below zero. These physical requirements lead to a series of constraints to ensure that the initial tank level $Q_0$ of each TES tank at the beginning of the optimization period plus all of the charging during time steps 1 to k into the optimization period is less than or equal to the maximum capacity $Q_{max}$ of the TES tank. A similar constraint may be implemented to ensure that the initial tank level $Q_0$ of each TES tank at the beginning of the optimization period minus all of the discharging during time steps 1 to k into the optimization period is greater than or equal to zero.

The tank capacity constraints for hot TES subplant 20 can be placed in the form Ax≤b by defining the A matrix and the b vector as follows:

$$A = \begin{bmatrix} [0_h] & [0_h] & [0_h] & t_s[\Delta_h] & [0_h] \\ [0_h] & [0_h] & [0_h] & t_s[-\Delta_h] & [0_h] \end{bmatrix}, b = \begin{bmatrix} Q_{0,Hot}[I_h] \\ Q_{max,Hot} - Q_{0,Hot}[I_h] \end{bmatrix}$$

where $Q_{0,Hot}$ is the initial charge level of hot TES subplant 20 at the beginning of the optimization period, $Q_{max,Hot}$ is the maximum charge level of hot TES subplant 20, $\Delta_h$ is a lower triangular matrix of ones, and $t_s$ is the duration of a time step. Discharging the tank is represented in the top row of the A matrix as positive flow from the tank and charging the tank is represented in the bottom row of the A matrix as negative flow from the tank. Similar inequality constraints for cold TES subplant 22 can be placed in the form Ax≤b by defining the A matrix and the b vector as follows:

$$A = \begin{bmatrix} [0_h] & [0_h] & [0_h] & [0_h] & t_s[\Delta_h] \\ [0_h] & [0_h] & [0_h] & [0_h] & t_s[-\Delta_h] \end{bmatrix}, b = \begin{bmatrix} Q_{0,cold}[I_h] \\ Q_{max,Cold} - Q_{0,Cold}[I_h] \end{bmatrix}$$

where $Q_{0,Cold}$ is the initial charge level of cold TES subplant 22 at the beginning of the optimization period and $Q_{max,Cold}$ is the maximum charge level of cold TES subplant 22.

Still referring to FIG. 4, high level optimization module 130 is shown to include an equality constraints module 148. Equality constraints module 148 may formulate or define one or more equality constraints on the optimization problem solved by linear program module 144. The equality constraints may ensure that the predicted thermal energy loads of the building or campus are satisfied for each time step k in the optimization period. Equality constraints module 148 may formulate an equality constraint for each type of thermal energy load (e.g., hot water, cold water, etc.) to ensure that the load is satisfied. The equality constraints may be given by the following equation:

$$\sum_{i=1}^{n_s} \dot{Q}_{p,i,k} = \hat{\ell}_{p,k} \ \forall \ k \in \text{horizon}$$

where $\dot{Q}_{p,i,k}$ is the thermal energy load of type p (e.g., hot water, cold water, etc.) on the ith subplant during time step k, $n_s$ is the total number of subplants capable of serving thermal energy load p, and $\hat{\ell}_{p,k}$ is the predicted thermal energy load of type p that must be satisfied at time step k. The predicted thermal energy loads may be received as load predictions from load/rate prediction module 122.

In some embodiments, the predicted thermal energy loads include a predicted hot water thermal energy load $\hat{\ell}_{Hot,k}$ and a predicted cold water thermal energy load $\hat{\ell}_{Cold,k}$ for each time step k. The predicted hot water thermal energy load $\hat{\ell}_{Hot,k}$ may be satisfied by the combination of heat recovery chiller subplant 14, heater subplant 12, and hot TES subplant 20. The predicted cold water thermal energy load $\hat{\ell}_{Cold,k}$ may be satisfied by the combination of heat recovery chiller subplant 14, chiller subplant 16, and cold TES subplant 22.

The equality constraints can be placed in the form Hx=g by defining the H matrix and the g vector as follows:

$$H = \begin{bmatrix} [I_h] & [I_h] & [0_h] & [0_h] & [I_h] \\ [0_h] & (1 + u_{elec,hrChiller}[I_h]) & [I_h] & [I_h] & [0_h] \end{bmatrix},$$

$$g = \begin{bmatrix} \hat{\ell}_{Cold,1\ldots k} \\ \hat{\ell}_{Hot,1\ldots k} \end{bmatrix}$$

where $\hat{\ell}_{Cold,1\ldots k}$ and $\hat{\ell}_{Hot,1\ldots k}$ are k-dimensional vectors of predicted cold water loads and predicted hot water loads, respectively, at each of time steps k, and $u_{elec,hrChiller}$ is the electrical consumption of heat recovery chiller subplant 14. For central plants that serve one or more additional types of loads, an additional row may be added to the H matrix and the g vector to define the equality constraints for each additional load served by the central plant.

For this example problem, assuming an optimization period of 72 one-hour samples, the linear program has 360 decision variables and 1224 constraints. However, linear program module 144 can solve this linear program to determine the optimal subplant load values in less than 200 milliseconds using the linear programming framework. Advantageously, this allows high level optimization module 130 to determine the subplant load distribution for a long optimization period in a very short timeframe.

Still referring to FIG. 4, high level optimization module 130 is shown to include an unmet loads module 150. In some instances, the central plant equipment 60 may not have enough capacity or reserve storage to satisfy the predicted thermal energy loads, regardless of how the thermal energy loads are distributed across subplants 12-22. In other words, the high level optimization problem may have no solution that satisfies all of the inequality and equality constraints, even if the applicable subplants are operated at maximum capacity. Unmet loads module 150 may be configured to modify the high level optimization problem to account for this possibility and to allow the high level optimization to find the solution that results in the minimal amount of unmet loads.

In some embodiments, unmet loads module 150 modifies the decision variable matrix x by introducing a slack variable for each type of thermal energy load. The slack variables represent an unsatisfied (e.g., unmet, deferred, etc.) amount of each type of thermal energy load. For example, unmet loads module 150 may modify the decision variable matrix x as follows:

$$x = [\dot{Q}_{Chiller,1} \ldots {}_n \dot{Q}_{hrChiller,1} \ldots {}_n \dot{Q}_{Heater,1} \ldots {}_n \\ \dot{Q}_{HotStorage,1} \ldots {}_n \dot{Q}_{ColdStorage,1} \ldots {}_n \\ \dot{Q}_{ColdUnmet,1} \ldots {}_n \dot{Q}_{HotUnmet,1} \ldots {}_n]^T$$

where $Q_{ColdUnmet,1\ldots n}$ and $Q_{HotUnmet,1\ldots n}$ are n-dimensional vectors representing a total deferred cold thermal energy load and a total deferred hot thermal energy load, respectively, at each time step k within the optimization period. In some embodiments, the decision variables $Q_{ColdUnmet,1\ldots n}$ and $Q_{HotUnmet,1\ldots n}$ represent total deferred loads that have accumulated up to each time step k rather than the incremental deferred load at each time step. The total deferred load may be used because any deferred load is likely to increase the required load during subsequent time steps.

Unmet loads module 150 may modify the equality constraints to account for any deferred thermal energy loads. The modified equality constraints may require that the predicted thermal energy loads are equal to the total loads satisfied by subplants 12-22 plus any unsatisfied thermal energy loads. The modified equality constraints can be placed in the form Hx=g by defining the H matrix and the g vector as follows:

$$H = \begin{bmatrix} [I_h] & [I_h] & [0_h] & [0_h] & [I_h] & [I_h]-[D_{-1}] & [0_h] \\ [0_h] & (1+u_{elec,hrChiller}[I_h]) & [I_h] & [I_h] & [0_h] & [0_h] & [I_h]-[D_{-1}] \end{bmatrix},$$

$$g = \begin{bmatrix} \ell_{Cold,1 \ldots k} \\ \ell_{Hot,1 \ldots k} \end{bmatrix}$$

where $[D_{-1}]$ is a lower diagonal matrix of ones.

Unmet loads module 150 may modify the cost vector c to associate cost values with any unmet loads. In some embodiments, unmet loads module 150 assigns unmet loads a relatively higher cost compared to the costs associated with other types of loads in the decision variable matrix x. Assigning a large cost to unmet loads ensures that the optimal solution to the high level optimization problem uses unmet loads only as a last resort (i.e., when the optimization has no solution without using unmet loads). Accordingly, linear program module 144 may avoid using unmet loads if any feasible combination of equipment is capable of satisfying the predicted thermal energy loads. In some embodiments, unmet loads module 150 assigns a cost value to unmet loads that allows linear program module 144 to use unmet loads in the optimal solution even if the central plant is capable of satisfying the predicted thermal energy loads. For example, unmet loads module 150 may assign a cost value that allows linear program module 144 to use unmet loads if the solution without unmet loads would be prohibitively expensive and/or highly inefficient.

Still referring to FIG. 4, high level optimization module 130 is shown to include a subplant curves module 170. In the simplest case described with reference to linear program module 144, it was assumed that the resource consumption of each subplant is a linear function of the thermal energy load produced by the subplant. However, this assumption may not be true for some subplant equipment, much less for an entire subplant. Subplant curves module 170 may be configured to modify the high level optimization problem to account for subplants that have a nonlinear relationship between resource consumption and load production.

Subplant curves module 170 is shown to include a subplant curve updater 172, a subplant curves database 174, a subplant curve linearizer 176, and a subplant curves incorporator 178. Subplant curve updater 172 may be configured to request subplant curves for each of subplants 12-22 from low level optimization module 132. Each subplant curve may indicate an amount of resource consumption by a particular subplant (e.g., electricity use measured in kW, water use measured in L/s, etc.) as a function of the subplant load. Exemplary subplant curves are shown and described in greater detail with reference to FIGS. 5A-8.

In some embodiments, low level optimization module 132 generates the subplant curves by running the low level optimization process for various combinations of subplant loads and weather conditions to generate multiple data points. Low level optimization module 132 may fit a curve to the data points to generate the subplant curves and provide the subplant curves to subplant curve updater 172. In other embodiments, low level optimization module 132 provides the data points to subplant curve updater 172 and subplant curve updater 172 generates the subplant curves using the data points. Subplant curve updater 172 may store the subplant curves in subplant curves database 174 for use in the high level optimization process.

Figure 6:
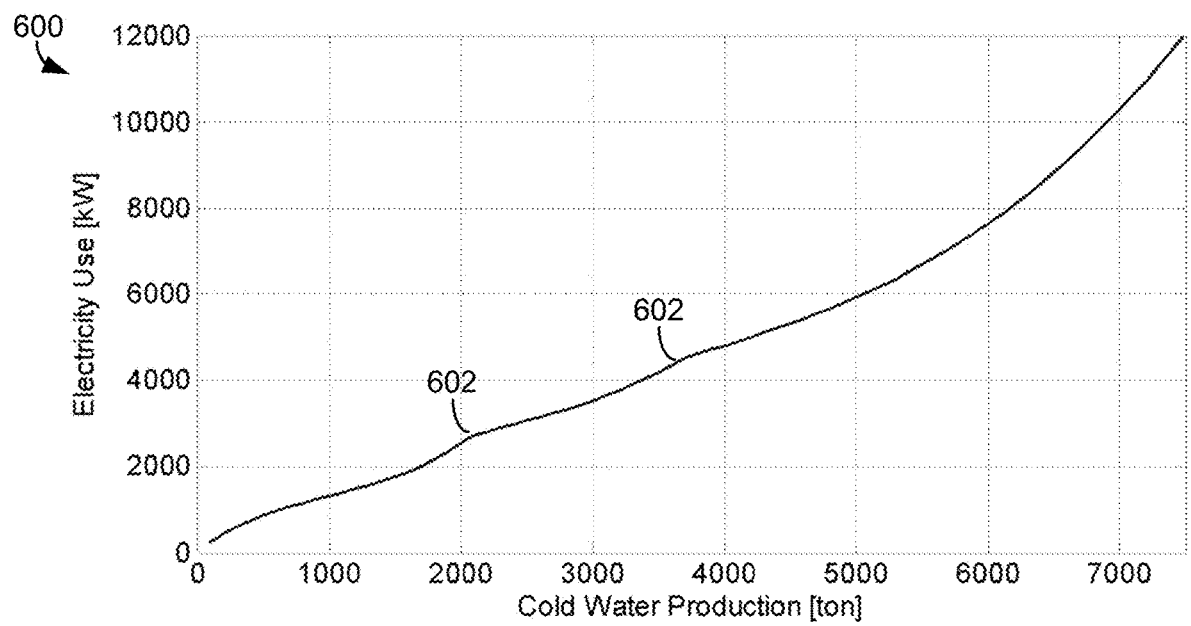
FIG. 6 is a non-convex and nonlinear subplant curve that may be generated from experimental data or by combining equipment curves for individual devices of the central plant, according to an exemplary embodiment.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 120. For some devices, the device efficiency curves may indicate that resource consumption is a U-shaped function of load. Accordingly, when multiple device efficiency curves are combined into a subplant curve for the entire subplant, the resultant subplant curve may be a wavy curve as shown in FIG. 6. The waves are caused by a single device loading up before it is more efficient to turn on another device to satisfy the subplant load.

Figure 7:
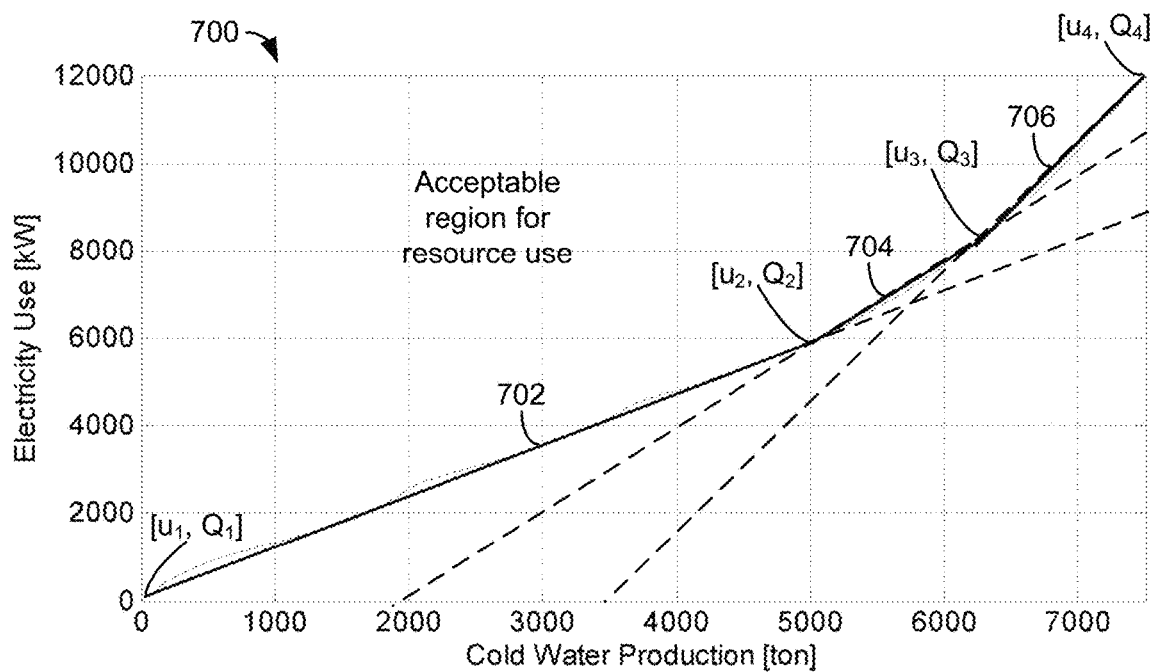
FIG. 7 is a linearized subplant curve that may be generated from the subplant curve of FIG. 6 by converting the non-convex and nonlinear subplant curve into piecewise linear segments, according to an exemplary embodiment.

Subplant curve linearizer 176 may be configured to convert the subplant curves into convex curves. A convex curve is a curve for which a line connecting any two points on the curve is always above or along the curve (i.e., not below the curve). Convex curves may be advantageous for use in the high level optimization because they allow for an optimization process that is less computationally expensive relative to an optimization process that uses non-convex functions. Subplant curve linearizer 176 may be configured to break the subplant curves into piecewise linear segments that combine to form a piecewise-defined convex curve. An unmodified subplant curve 600 and a linearized subplant curve 700 generated by subplant curve linearizer 176 are shown in FIGS. 6 and 7, respectively. Subplant curve linearizer 176 may store the linearized subplant curves in subplant curves database 174.

Still referring to FIG. 4, subplant curves module 170 is shown to include a subplant curve incorporator 178. Subplant curve incorporator 178 may be configured to modify the high level optimization problem to incorporate the subplant curves into the optimization. In some embodiments, subplant curve incorporator 178 modifies the decision matrix x to include one or more decision vectors representing the resource consumption of each subplant. For example, for chiller subplant 16, subplant curve incorporator 178 may modify the decision matrix x as follows:

$$x = [ \ldots \dot{Q}_{Chiller,1 \ldots n} \ldots u_{Chiller,elec,1 \ldots n} \; u_{Chiller,water,1 \ldots n} \ldots ]^T$$

where $u_{Chiller,elec,1 \ldots n}$ and $u_{Chiller,water,1 \ldots n}$ are n-dimensional vectors representing the amount of electrical consumption and water consumption, respectively, by chiller subplant 16 at each time step k.

Subplant curve incorporator 178 may add one or more resource consumption vectors to matrix x for each of subplants 12-22. The decision vectors added by subplant curve incorporator 178 for a given subplant may represent an amount of resource consumption for each resource consumed by the subplant (e.g., water, electricity, natural gas, etc.) at each time step k within the optimization period. For example, if heater subplant 12 consumes natural gas, electricity, and water, subplant curve incorporator 178 may add a decision vector $u_{Heater,gas,1 \ldots n}$ representing an amount of natural gas consumed by heater subplant 12 at each time step, a decision vector $u_{Heater,elec,1 \ldots n}$ representing an amount of electricity consumed by heater subplant 12 at each time step, and a decision vector $u_{Heater,water,1 \ldots n}$ representing an amount of water consumed by heater subplant at each time step. Subplant curve incorporator 178 may add resource consumption vectors for other subplants in a similar manner.

Subplant curve incorporator 178 may modify the cost vector c to account for the resource consumption vectors in the decision matrix x. In some embodiments, subplant curve incorporator 178 removes (or sets to zero) any cost directly associated with the subplant loads (e.g., $\dot{Q}_{Chiller,1 \ldots n}$, $\dot{Q}_{Heater,1 \ldots n}$, etc.) and adds economic costs associated with the resource consumption required to produce the subplant loads. For example, for chiller subplant 16, subplant curve incorporator 178 may modify the cost vector c as follows:

$$c=[\ldots 0_n \ldots c_{elec,1} \ldots {}_n c_{water,1} \ldots {}_n \cdots]^T$$

where $0_n$ n is a n-dimensional zero vector indicating that the direct economic cost of $\dot{Q}_{Chiller,1 \ldots n}$ is zero at each time step, $c_{elec,1 \ldots n}$ is a n-dimensional vector indicating the per unit cost of electricity at each time step, and $c_{water,1 \ldots n}$ is a n-dimensional vector indicating the per unit cost of water at each time step. The modified cost vector associates an economic cost with the resources consumed to produce the subplant loads rather than the subplant loads themselves. In some embodiments, the values for $c_{elec,1 \ldots n}$ and $c_{water,1 \ldots n}$ are utility rates obtained from load/rate prediction module 122.

Subplant curve incorporator 178 may modify the inequality constraints to ensure that the proper amount of each resource is consumed to serve the predicted thermal energy loads. In some embodiments, subplant curve incorporator 178 formulates inequality constraints that force the resource usage for each resource in the epigraph of the corresponding linearized subplant curve. For example, chiller subplant 16 may have a linearized subplant curve that indicates the electricity use of chiller subplant 16 (i.e., $u_{Chiller,elec}$) as a function of the cold water production of chiller subplant 16 (i.e., $\dot{Q}_{Chiller}$). Such a linearized subplant curve 700 is shown in FIG. 7. The linearized subplant curve may include a first line segment connecting point $[u_1, Q_1]$ to point $[u_2, Q_2]$, a second line segment connecting point $[u_2, Q_2]$ to point $[u_3, Q_3]$, and a third line segment connecting point $[u_3, Q_3]$ to point $[u_4, Q_4]$.

Subplant curve incorporator 178 may formulate an inequality constraint for each piecewise segment of the subplant curve that constrains the value of $u_{Chiller,elec}$ to be greater than or equal to the amount of electricity use defined by the line segment for the corresponding value of $\dot{Q}_{Chiller}$. The subplant curve constraints for the electricity use of chiller subplant 16 can be placed in the form $Ax \leq b$ by defining the A matrix and the b vector as follows:

$$A = \begin{bmatrix} \ldots & [-(u_2 - u_1)]I_n & \ldots & [(Q_2 - Q_1)]I_n & 0_n & \ldots \\ \ldots & [-(u_3 - u_2)]I_n & \ldots & [(Q_3 - Q_2)]I_n & 0_n & \ldots \\ \ldots & [-(u_4 - u_3)]I_n & \ldots & [(Q_4 - Q_3)]I_n & 0_n & \ldots \end{bmatrix},$$

$$b = \begin{bmatrix} Q_1 u_2 - Q_2 u_1 \\ Q_2 u_3 - Q_3 u_2 \\ Q_3 u_4 - Q_4 u_3 \end{bmatrix}$$

Similar inequality constraints can be formulated for other subplant curves. For example, subplant curve incorporator 178 may generate a set of inequality constraints for the water consumption $u_{Chiller,water,1 \ldots n}$ of chiller subplant 16 using the points defining the linearized subplant curve for the water consumption $u_{Chiller,water,1 \ldots n}$ of chiller subplant 16 as a function of cold water production $\dot{Q}_{Chiller}$. In some embodiments, the water consumption of chiller subplant 16 is equal to the cold water production and the linearized subplant curve for water consumption includes a single line segment connecting point $[u_5, Q_5]$ to point $[u_6, Q_6]$ (as shown in FIG. 5B). The subplant curve constraints for the cold water consumption of chiller subplant 16 can be placed in the form $Ax \leq b$ by defining the A matrix and the b vector as follows:

$$A = [\ldots [-(u_6 - u_5)]I_n \ldots 0_n [(Q_6 - Q_5)]I_n \ldots], b = [Q_5 u_6 - Q_6 u_5]$$

Subplant curve incorporator 178 may repeat this process for each subplant curve for chiller subplant 16 and for the other subplants of central plant 10 to define a set of inequality constraints for each subplant curve.

The inequality constraints generated by subplant curve incorporator 178 ensure that high level optimization module 130 keeps the resource consumption above all of the line segments of the corresponding subplant curve. In most situations, there is no reason for high level optimization module 130 to choose a resource consumption value that lies above the corresponding subplant curve due to the economic cost associated with resource consumption. High level optimization module 130 can therefore be expected to select resource consumption values that lie on the corresponding subplant curve rather than above it.

The exception to this general rule is heat recovery chiller subplant 14. The equality constraints for heat recovery chiller subplant 14 provide that heat recovery chiller subplant 14 produces hot water at a rate equal to the subplant's cold water production plus the subplant's electricity use. The inequality constraints generated by subplant curve incorporator 178 for heat recovery chiller subplant 14 allow high level optimization module 130 to overuse electricity to make more hot water without increasing the amount of cold water production. This behavior is extremely inefficient and only becomes a realistic possibility when the demand for hot water is high and cannot be met using more efficient techniques. However, this is not how heat recovery chiller subplant 14 actually operates.

To prevent high level optimization module 130 from overusing electricity, subplant curve incorporator 178 may check whether the calculated amount of electricity use (determined by the optimization algorithm) for heat recovery chiller subplant 14 is above the corresponding subplant curve. In some embodiments, the check is performed after each iteration of the optimization algorithm. If the calculated amount of electricity use for heat recovery chiller subplant 14 is above the subplant curve, subplant curve incorporator 178 may determine that high level optimization module 130 is overusing electricity. In response to a determination that high level optimization module 130 is overusing electricity, subplant curve incorporator 178 may constrain the production of heat recovery chiller subplant 14 at its current value and constrain the electricity use of subplant 14 to the corresponding value on the subplant curve. High level optimization module 130 may then rerun the optimization with the new equality constraints.

Still referring to FIG. 4, high level optimization module 130 is shown to include a ground loop module 152 and a heat exchanger module 154. In some embodiments, central plant 10 includes a heat exchanger configured to transfer heat between hot water loop 24 and condenser water loop 28. In some embodiments, central plant 10 includes a ground loop that serves as heat rejection for chiller subplant 16 and/or heat extraction for heat recovery chiller subplant 14. Ground loop module 152 and heat exchanger module 154 may be configured to modify the optimization problem to account for heat transfer resulting from operation of the heat exchanger and/or the ground loop.

Ground loop module 152 may incorporate heat rejection to the ground loop into the optimization problem by changing the amount of electricity and water usage by chiller subplant 16. For example, for loadings up to the heat rejection capacity of the ground loop, chiller subplant 16 may use an additional amount of electricity to run the ground loop pumps. The additional electricity usage may be constant or may vary per unit of flow through the ground loop. The amount of water production of chiller subplant 16 may be constant regardless of whether the ground loop is used.

Ground loop module 152 and heat exchanger module 154 may modify the equality constraints to account for any overproduced thermal energy loads. The overproduced thermal energy loads may be added to the equality constraints as slack variables that operate in the opposite direction of the unmet loads. The modified equality constraints may require that the predicted thermal energy loads plus any overproduction are equal to the total loads satisfied by subplants 12-22 plus any unsatisfied thermal energy loads. The modified equality constraints can be placed in the form Hx=g by defining the H matrix and the g vector as follows:

$$H = \begin{bmatrix} [I_h] & [I_h] & [0_h] & [0_h] & [I_h] & [I_h]-[D_{-1}] & [0_h] & -[I_h] & [0_h] \\ [0_h] & (1+u_{elec,hrChiller}[I_h]) & [I_h] & [I_h] & [0_h] & [0_h] & [I_h]-[D_{-1}] & [0_h] & -[I_h] \end{bmatrix}$$

$$g = \begin{bmatrix} \hat{\ell}_{Cold,1 \ldots k} \\ \hat{\ell}_{Hot,1 \ldots k} \end{bmatrix}$$

Ground loop module 152 and heat exchanger module 154 may incorporate heat extraction from the ground loop and heat transfer between hot water loop 24 and condenser water loop 28 into the optimization problem in a similar manner. For example, ground loop module 152 and heat exchanger module 154 may use heat extraction from the ground loop and heat transfer between loops 24 and 28 to modify the load seen by the central plant equipment. Ground loop module 152 may use the ground loop to create what appears as a false building load to the equipment, thereby allowing heat recovery chiller subplant 14 to operate as heat pumps when the building load does not add enough heat to the system. This outcome may be optimal when the ratio between electricity prices and gas prices is low such that it is less expensive to operate the ground loop and the heat exchanger using electricity than it would be to use natural gas to generate heat in heater subplant 12.

Heat exchanger module 154 may use the heat exchanger to create what appears to be a false hot water building load, thereby allowing heat recovery chiller subplant 14 to operate as conventional chillers. The excess heat from heat recovery chiller subplant 14 may be transferred through the heat exchanger to condenser loop 28 and ultimately into the atmosphere or into the ground. In some embodiments, heat exchanger module 154 operates the heat exchanger to prevent condenser loop from becoming overloaded. For example, heat exchanger module 154 may limit the total heat rejected to the capacity of condenser loop 28 minus the heat produced by the conventional chillers.

Ground loop module 152 and heat exchanger module 154 may modify the decision matrix x by adding a new decision vector for each type of thermal energy load. The new decision vectors may represent the overproduction of each thermal energy load for each time step k within the optimization period. For example, the modified decision matrix may appear as follows:

$$x = [\dot{Q}_{Chiller,1} \ldots \ _n \dot{Q}_{hrChiller,1} \ldots \ _n \dot{Q}_{Heater,1} \ldots \ _n$$
$$\dot{Q}_{HotStorage,1} \ldots \ _n \dot{Q}_{ColdStorage,1} \ldots \ _n \cdots,$$
$$\dot{Q}_{ColdUnmet,1} \ldots \ _n \dot{Q}_{HotUnmet,1} \ldots \ _n$$
$$\dot{Q}_{ColdOver,1} \ldots \ _n \dot{Q}_{HotOver,1} \ldots \ _n]^T$$

where $\dot{Q}_{ColdOver,1 \ldots n}$ and $\dot{Q}_{HotOver,1 \ldots n}$ are n-dimensional vectors representing the overproduction rates of the cold thermal energy load and the hot thermal energy load, respectively, for each time step k within the optimization period.

where $[D_{-1}]$ is a lower diagonal matrix of ones. Ground loop module 152 and heat exchanger module 154 may modify the cost vector c with the additional cost of the pumping power per unit of overproduction required to run the ground loop and/or the heat exchanger.

Still referring to FIG. 4, high level optimization module 130 is shown to include a demand charge module 156. As discussed above, optimization framework module 142 may formulate the optimization problem as:

$$\operatorname*{argmin}_x c^T x; \text{ subject to } Ax \leq b, Hx = g$$

However, such a formulation does not account for the demand charge.

The demand charge is an additional charge imposed by some utility providers based on the maximum rate of energy consumption during an applicable demand charge period. For example, the demand charge may be provided in terms of dollars per unit of power (e.g., $/kW) and may be multiplied by the peak power usage (e.g., kW) during a demand charge period to calculate the demand charge. In some instances, the demand charge can account for more than 15% of the electrical bill. Failure to include the demand charge in the optimization scheme can cause all of the equipment to turn on at the same time (e.g., the most efficient or lowest cost time). This would be optimal from a consumption cost standpoint. However, shifting some of the load in time may save thousands of dollars on demand while only costing a few dollars in consumption cost.

Demand charge module 156 may be configured to modify the optimization problem to account for the demand charge. Incorporating the demand charge into the optimization framework may greatly improve the performance of the high level optimization. For example, including the demand charge in the optimization framework may reduce the total operating costs of central plant 10 by an additional 5% on top of the 8-10% cost reduction provided by other modules of central plant controller 102. In various implementations, the savings provided by demand charge module 156 and/or central plant controller 102 as a whole may be greater than or less than the exemplary amounts defined herein due to differences in plant configuration and/or energy costs.

Demand charge module 156 may account for the demand charge by modifying the cost function used by high level optimization module 130. The modified cost function may be defined as:

$$\mathop{\mathrm{argmin}}_{x}[c^T x + c_{demand}\max(P_{elec,k})]; \text{ subject to } Ax \leq b, Hx = g$$

where $c_{demand}$ is the demand charge (e.g., \$/kW) for the applicable demand charge period and $P_{elec,k}$ is the total electrical power consumption of central plant 10 and the building/campus at time step k. The term $\max(P_{elec,k})$ selects the peak electrical power consumption at any time during the demand charge period. The demand charge $c_{demand}$ and the demand charge period may be defined by the utility rate information received from utilities 126 and may be provided to high level optimization module 130 by load/rate prediction module 122.

Incorporating the demand charge into the optimization framework complicates the optimization problem in two primary ways. First, the cost function is no longer linear due to the inclusion of the max ( ) function. Second, the consumption term $c^T x$ calculates cost over a consumption period defined by a time horizon, whereas the demand charge term $c_{demand} \max(P_{elec,k})$ calculates cost over the demand charge period. For example, the consumption period may be defined as the time period beginning at the current time step k and ending at a future time step k+h, where h represents the time horizon. The demand charge period may be defined by utilities 126 and provided to high level optimization module 130 along with the utility rate information. In some instances, the consumption period and the demand charge period may not be the same. This complicates the optimization problem by obfuscating potential trade-offs between control decisions that reduce the consumption term at the expense of the demand charge term or vice versa.

Demand charge module 156 may modify the optimization problem to incorporate the demand charge term into the linear optimization framework. For example, demand charge module 156 may modify the decision matrix x by adding a new decision variable $x_{peak}$ as follows:

$$x_{new} = [\ \ldots\ \ u_{Chiller,elec,1}\ \ldots\ n\ \ldots\\ u_{hpChiller,elec,1}\ \ldots\ n\ \cdots\ u_{Heater,elec,1}\ \ldots\ n\ \cdots\\ x_{peak}]^T$$

where $x_{peak}$ is the peak power consumption within the demand charge period. Demand charge module 156 may modify the cost vector c as follows:

$$c_{new} = [\ \ldots\ \ c_{elec,1}\ \ldots\ n\ \cdots\ c_{elec,1}\ \ldots\ n\ \cdots\\ c_{elec,1}\ \ldots\ n\ \cdots\ c_{demand}]^T$$

such that the demand charge $c_{demand}$ is multiplied by the peak power consumption $x_{peak}$.

Demand charge module 156 may formulate and/or apply inequality constraints to ensure that the peak power consumption $x_{peak}$ is greater than or equal to the maximum electric demand over the demand charge period. I.e.:

$$x_{peak} \geq \max(u_{Chiller,elec,k} + u_{hpChiller,elec,k} + u_{Heater,elec,k} + P_{elec,campus,k}) \forall k \in \text{horizon}$$

This inequality constraint may be represented in the linear optimization framework by defining the A matrix and the b vector as follows:

$$A = [\ \ldots\ \ [I_h]\ \ldots\ [I_h]\ \ldots\ [I_h]\ \ldots\ -1],\\ b = -P_{elec,campus,k}$$

During the high level optimization process, high level optimization module 130 may choose a $x_{peak}$ that is equal to the maximum electrical demand over the demand charge period to minimize the cost associated with $x_{peak}$.

Demand charge module 156 may apply an inequality constraint to ensure that the peak power consumption decision variable $x_{peak}$ is greater than or equal to its previous value $x_{peak,previous}$ during the demand charge period. This inequality constraint may be represented in the linear optimization framework by defining the A matrix and the b vector as follows:

$$A = [\ \ldots\ -1], b = -x_{peak,previous}$$

Advantageously, the modifications to the decision variable matrix x, the cost vector c, and the inequality constraints provided by demand charge module 156 allow the cost function to be written in a linear form as follows:

$$\mathop{\mathrm{argmin}}_{x}[c_{new}^T x_{new}] = \mathop{\mathrm{argmin}}_{x}[c^T x + c_{demand} x_{peak}];$$

subject to $Ax \leq b, Hx = g$

This linear form of the cost function can be used in the linear optimization framework.

The cost function as written in the previous equation has components that are over different time periods. For example, the consumption term $c^T x$ is over the consumption period whereas the demand charge term $c_{demand} x_{peak}$ is over the demand charge period. To properly make the trade-off between increasing the demand charge versus increasing the cost of energy consumption, demand charge module 156 may apply a weighting factor to the demand charge term and/or the consumption term. For example, demand charge module 156 may divide the consumption term $c^T x$ by the duration h of the consumption period (i.e., the time period between the current time and the time horizon) and multiply by the amount of time $d_{demand}$ remaining in the current demand charge period so that the entire cost function is over the demand charge period. The new optimization function may be given by:

$$\mathop{\mathrm{argmin}}_{x}\left[\frac{d_{demand}}{h} c^T x + c_{demand} x_{peak}\right]; \text{ subject to } Ax \leq b, Hx = g$$

which is equivalent to:

$$\mathop{\mathrm{argmin}}_{x}\left[c^T x + \frac{h}{d_{demand}} c_{demand} x_{peak}\right]; \text{ subject to } Ax \leq b, Hx = g$$

The latter form of the new optimization function has the advantage of adjusting only one term of the function rather than several.

Still referring to FIG. 4, high level optimization module 130 is shown to include a load change penalty module 158. In some instances, high level optimization module 130 determines a solution to the optimization problem that includes significantly changing the load on one or more of subplants 12-22 within a relatively short timeframe. For example, the lowest cost solution from a resource consumption standpoint may involve taking a subplant from off to full load and back to off again within only a few time steps. This behavior may result from high level optimization module 130 identifying small fluctuations in the economic cost of resources and operating central plant 10 accordingly to achieve the minimal economic cost. However, operating central plant 10 in such a way may be undesirable due to various negative effects of rapidly changing the subplant loads (e.g., increased equipment degradation), especially if the cost saved is relatively minimal (e.g., a few cents or dollars).

Load change penalty module 158 may modify the optimization problem to introduce a penalty for rapidly changing the subplant loads. For example, load change penalty module 158 may modify the decision matrix x by adding a new decision vector for each subplant. The new decision vectors represent the change in subplant load for each subplant from one time step to the next. For example, load change penalty module 158 may modify the decision matrix x as follows:

$$x = [\ldots \dot{Q}_{Chiller,1} \ldots n \ldots \dot{Q}_{hrChiller,1} \ldots n \ldots \\ \dot{Q}_{Heater,1} \ldots n \ldots \delta_{Chiller,1} \ldots n \\ \delta_{hrChiller,1} \ldots n \delta_{Heater,1} \ldots n]^T$$

where $\delta_{Chiller,1 \ldots n}$, $\delta_{hrChiller,1 \ldots n}$, and $\delta_{Heater,1 \ldots n}$ are n-dimensional vectors representing the change in subplant load for $\dot{Q}_{Chiller,1 \ldots n}$, $\dot{Q}_{hrChiller,1 \ldots n}$, and $\dot{Q}_{Heater,1 \ldots n}$, respectively, at each time step k relative to the previous time step k−1.

Load change penalty module 158 may modify the cost vector c to add a cost associated with changing the subplant loads. For example, load change penalty module 158 may modify the cost vector c as follows:

$$c = [\ldots \ 0_n \ \ldots \ 0_n \ \ldots \ 0_n \ \ldots \\ c_{\delta Chiller,1} \ldots n c_{\delta hrChiller,1} \ldots n c_{\delta Heater,1} \ldots n]^T$$

Load change penalty module 158 may add constraints such that each of the load change variables δ cannot be less than the change in the corresponding subplant load $\dot{Q}$. For example, the added constraints for chiller subplant 16 may have the following form:

$$A = \begin{bmatrix} \ldots & I_h - D_{-1} & \ldots & -[I_h] & [0_h] & [0_h] \\ \ldots & D_{-1} - I_h & \ldots & -[I_h] & [0_h] & [0_h] \\ \vdots & \vdots & \vdots & \vdots & \vdots & \vdots \end{bmatrix}, b = \begin{bmatrix} \begin{bmatrix} \dot{Q}_{Chiller,old} \\ 0_{h-1} \end{bmatrix} \\ \begin{bmatrix} -\dot{Q}_{Chiller,old} \\ 0_{h-1} \end{bmatrix} \\ \vdots \end{bmatrix}$$

where $\dot{Q}_{Chiller,old}$ is the value for $\dot{Q}_{Chiller}$ at the previous time step. Similar constraints may be added for each of subplants 12-22.

The constraints added by load change penalty module 158 require that the load change variables δ are greater than or equal to the magnitude of the difference between the current value of the corresponding subplant load $\dot{Q}$ and the previous value of the subplant load $\dot{Q}_{old}$. In operation, high level optimization module 130 may select values for the load change variables δ that are equal to the magnitude of the difference due to the costs associated with the load change variables. In other words, high level optimization module 130 may not choose to make the load change variables δ greater than the actual change in the corresponding subplant load because making the load change variables δ greater than necessary would be suboptimal.

Still referring to FIG. 4, high level optimization module 130 is shown to include a tank forced full module 160. Tank forced full module 160 may modify the optimization problem such that the thermal energy storage (TES) tanks are forced to full at the end of the optimization period. This feature provides increased robustness in the event of a subplant failure and/or controller failure by ensuring that the TES tanks have sufficient stored thermal energy to satisfy building loads while the failure is being repaired. For example, plant operators can use the stored thermal energy to meet the building loads while central plant controller 102 is brought back online.

Tank forced full module 160 may force the TES tanks to full by increasing the cost of discharging the TES tanks. In some embodiments, tank forced full module 160 modifies the cost of discharging the TES tanks such that the discharge cost is higher than other costs in the cost function, but less than the cost of unmet loads. This forces high level optimization module 130 to take the benefit (i.e., negative cost) of charging the TES tanks to their maximum values.

Figure 5A:
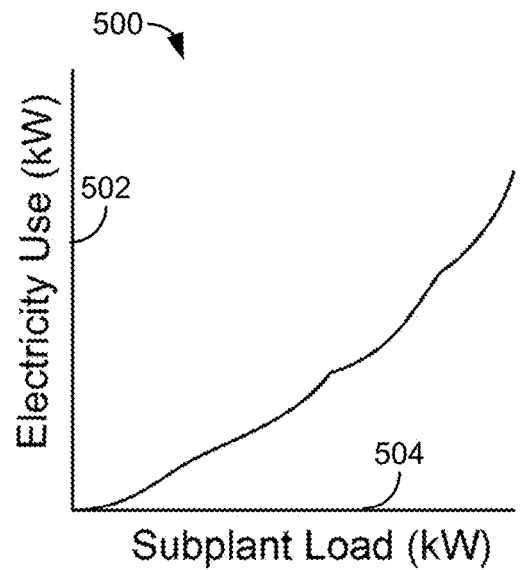
FIGS. 5A-5B are subplant curves illustrating a relationship between the resource consumption of a subplant and the subplant load and which may be used by the high level optimization module of FIG. 4 to optimize the performance of the central plant of FIG. 1, according to an exemplary embodiment.
Figure 5B:
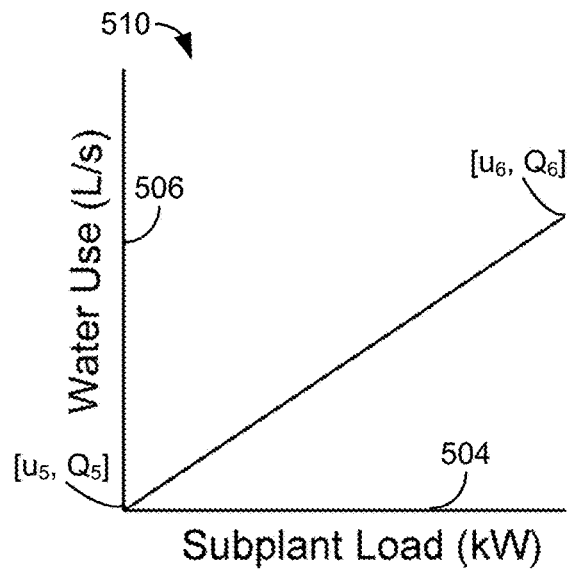

Referring now to FIGS. 5A-B, two subplant curves 500 and 510 are shown, according to an exemplary embodiment. Subplant curves 500 and 510 may be used as subplant curves 140, as described with reference to FIG. 3. Subplant curves 500 and 510 define the resource usage of a subplant (e.g., one of subplants 12-22) as a function of the subplant load. Each subplant curve may be specific to a particular subplant and a particular type of resource used by the subplant. For example, subplant curve 500 may define the electricity use 502 of chiller subplant 16 as a function of the load 504 on chiller subplant 16, whereas subplant curve 510 may define the water use 506 of chiller subplant 16 as a function of the load 504 on chiller subplant 16. Each of subplants 12-22 may have one or more subplant curves (e.g., one for each type of resource consumed by the subplant).

In some embodiments, low level optimization module 132 generates subplant curves 500 and 510 based on equipment models 120 (e.g., by combining equipment models 120 for individual devices into an aggregate curve for the subplant). Low level optimization module 132 may generate subplant curves 500 and 510 by running the low level optimization process for several different loads and weather conditions to generate multiple data points. Low level optimization module 132 may fit a curve to the data points to generate the subplant curves. In other embodiments, low level optimization module 132 provides the data points to high level optimization module 132 and high level optimization module 132 generates the subplant curves using the data points.

Referring now to FIG. 6, another subplant curve 600 is shown, according to an exemplary embodiment. Subplant curve 600 defines the electricity use of chiller subplant 16 (i.e., $u_{Chiller,elec}$) as a function of the cold water production of chiller subplant 16 (i.e., $\dot{Q}_{Chiller}$) In some embodiments, subplant curve 600 is generated by combining efficiency curves for individual devices of chiller subplant 16 (e.g., individual chillers, pumps, etc.). For example, each of the chillers in subplant 16 may have a device-specific efficiency curve that defines the amount of electricity use by the chiller as a function of the load on the chiller. Many devices operate less efficiently at higher loads and have device efficiency curves that are U-shaped functions of load. Accordingly, combining multiple device efficiency curves to form subplant curve 600 may result in subplant curve 600 having one or more waves 602, as shown in FIG. 6. Waves 602 may be caused by a single device loading up before it is more efficient to turn on another device to satisfy the subplant load.

Referring now to FIG. 7, a linearized subplant curve 700 is shown, according to an exemplary embodiment. Subplant curve 700 defines the electricity use of chiller subplant 16 (i.e., $u_{Chiller,elec}$) as a function of the cold water production of chiller subplant 16 (i.e., $\dot{Q}_{Chiller}$) Subplant curve 700 may be generated by converting subplant curve 600 into a linearized convex curve. A convex curve is a curve for which a line connecting any two points on the curve is always above or along the curve (i.e., not below the curve). Convex curves may be advantageous for use in the high level optimization because they allow for an optimization process that is less computationally expensive relative to an optimization process that uses non-convex functions.

In some embodiments, subplant curve 700 is generated by subplant curve linearizer 176, as described with reference to FIG. 4. Subplant curve 700 may be created by generating a plurality of linear segments (i.e., segments 702, 704, and 706) that approximate subplant curve 600 and combining the linear segments into a piecewise-defined linearized convex curve 700. Linearized subplant curve 700 is shown to include a first linear segment 702 connecting point $[u_1, Q_1]$ to point $[u_2, Q_2]$, a second linear segment 704 connecting point $[u_2, Q_2]$ to point $[u_3, Q_3]$, and a third linear segment 706 connecting point $[u_3, Q_3]$ to point $[u_4, Q_4]$. The endpoints of line segments 702-706 may be used to form constraints that force the electricity use of chiller subplant 16 in the epigraph of the linearized subplant curve 700.

Figure 8:
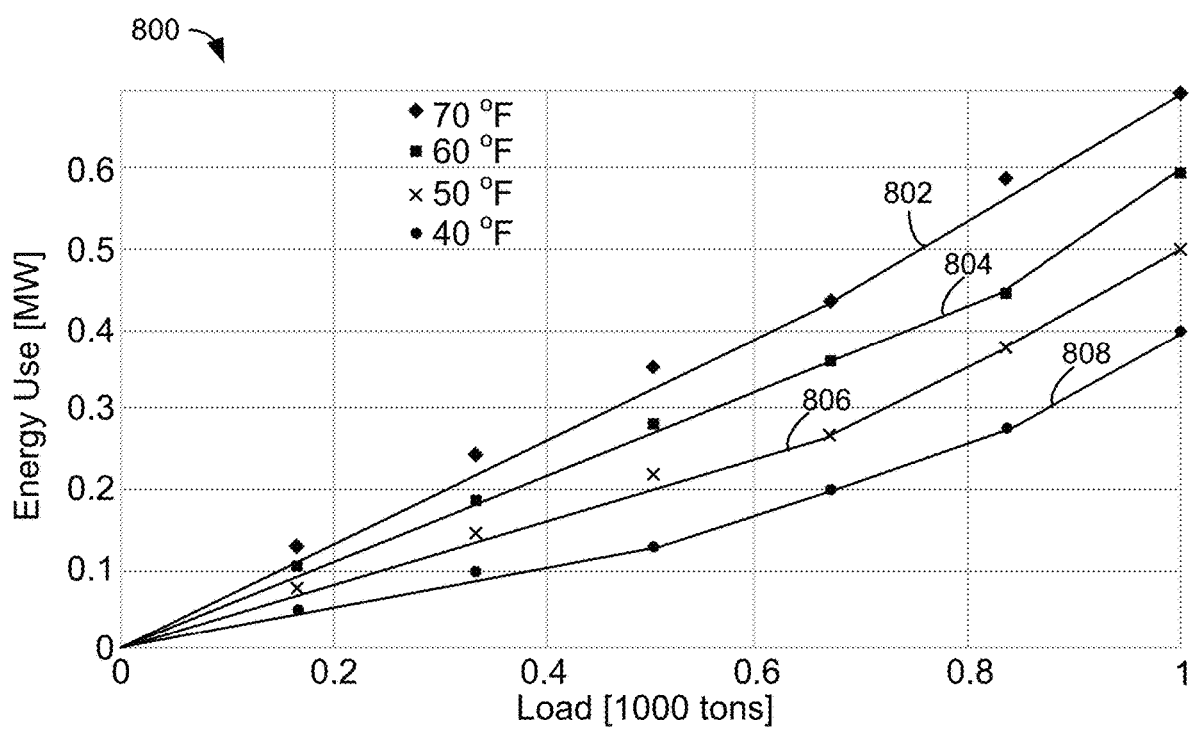
FIG. 8 is a graph illustrating a set of subplant curves that may be generated by the high level optimization module of FIG. 3 based on experimental data from a low level optimization module for multiple different environmental conditions, according to an exemplary embodiment.

Referring now to FIG. 8, another subplant curve 800 is shown, according to an exemplary embodiment. Subplant curve 800 defines the energy use of one of subplants 12-22 as a function of the load on the subplant for several different weather conditions. In some embodiments, subplant curve 800 is generated by subplant curves module 170 using experimental data obtained from the low level optimization module 132. For example, subplant curve updater 172 may request resource usage data from low level optimization module 132 for various combinations of load conditions and environmental conditions. In the embodiment shown in FIG. 8, subplant curve updater 172 requests energy use data for each combination of temperature (e.g., 40° F., 50° F., 60° F., and 70° F.) and load (e.g., 170 tons, 330 tons, 500 tons, 830 tons, and 1000 tons). Low level optimization module 132 may perform the low level optimization process for the requested load and temperature combinations and return an energy use value for each combination.

Subplant curve updater 172 may use the data points provided by low level optimization module 132 to find the best piecewise linear convex function that fits the data. For example, subplant curve updater 172 may fit a first subplant curve 802 to the data points at 70° F., a second subplant curve 804 to the data points at 60° F., a third subplant curve 806 to the data points at 50° F., and a fourth subplant curve 808 to the data points at 40° F. Subplant curve updater 172 may store the generated subplant curves 802-808 in subplant curves database 174 for use in the high level optimization algorithm.

In some implementations, central plant controller 102 uses high level optimization module 130 as part of an operational tool to exercise real-time control over central plant 10. In the operational tool, high level optimization module 130 may receive load and rate predictions from load/rate prediction module 122 and subplant curves (or data that can be used to generate subplant curves) from low level optimization module 132. When implemented in the operational tool, high level optimization module 130 may determine optimal subplant loads for heater subplant 12, heat recovery chiller subplant 14, chiller subplant 16, hot TES subplant 20, and/or cold TES subplant 22, as described with reference to FIGS. 2-4. In some embodiments, high level optimization module 130 determines ground loop and heat exchanger transfer rates in addition to the subplant loads. When implemented in the operational tool, high level optimization module 130 may provide the determined subplant loads and/or transfer rates to low level optimization module 132 for use in determining optimal on/off decisions and/or operating setpoints for the equipment of each subplant.

Figure 9:
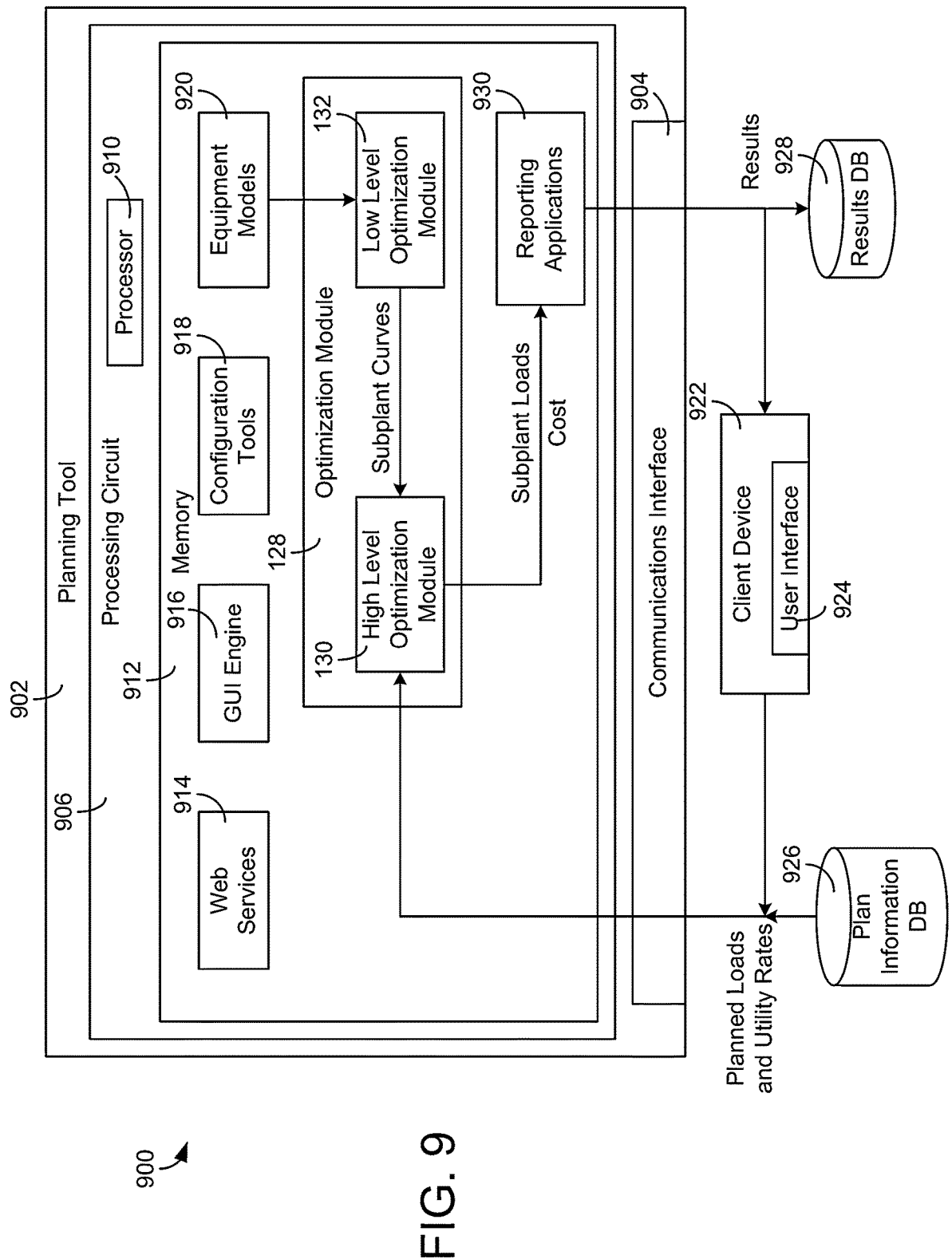
FIG. 9 is a block diagram of a planning system that incorporates the high level optimization module of FIG. 3, according to an exemplary embodiment.

Referring now to FIG. 9, a block diagram of a planning system 900 is shown, according to an exemplary embodiment. Planning system 900 may be configured to use optimization module 128 as part of a planning tool 902 to simulate the operation of a central plant over a predetermined time period (e.g., a day, a month, a week, a year, etc.) for planning, budgeting, and/or design considerations. When implemented in planning tool 902, optimization module 128 may operate in a similar manner as described with reference to FIGS. 2-4. For example, optimization module 128 may use building loads and utility rates to determine an optimal subplant load distribution to minimize cost over a simulation period. However, planning tool 902 may not be responsible for real-time control of a building automation system or central plant.

In planning tool 902, high level optimization module 130 may receive planned loads and utility rates for the entire simulation period. The planned loads and utility rates may be defined by input received from a user via a client device 922 (e.g., user-defined, user selected, etc.) and/or retrieved from a plan information database 926. High level optimization module 130 uses the planned loads and utility rates in conjunction with subplant curves from low level optimization module 132 to determine optimal subplant loads (i.e., an optimal dispatch schedule) for a portion of the simulation period.

The portion of the simulation period over which high level optimization module 130 optimizes the subplant loads may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, high level optimization module 130 requests all of the subplant curves used in the simulation from low level optimization module 132 at the beginning of the simulation. Since the planned loads and environmental conditions are known for the entire simulation period, high level optimization module 130 may retrieve all of the relevant subplant curves at the beginning of the simulation. In some embodiments, low level optimization module 132 generates functions that map subplant production to equipment level production and resource use when the subplant curves are provided to high level optimization module 130. These subplant to equipment functions may be used to calculate the individual equipment production and resource use (e.g., in a post-processing module) based on the results of the simulation.

Still referring to FIG. 9, planning tool 902 is shown to include a communications interface 904 and a processing circuit 906. Communications interface 904 may include wired or wireless interfaces (e.g., jacks, antennas, transmitters, receivers, transceivers, wire terminals, etc.) for conducting data communications with various systems, devices, or networks. For example, communications interface 904 may include an Ethernet card and port for sending and receiving data via an Ethernet-based communications network and/or a WiFi transceiver for communicating via a wireless communications network. Communications interface 904 may be configured to communicate via local area networks or wide area networks (e.g., the Internet, a building WAN, etc.) and may use a variety of communications protocols (e.g., BACnet, IP, LON, etc.).

Communications interface 904 may be a network interface configured to facilitate electronic data communications between planning tool 902 and various external systems or devices (e.g., client device 922, results database 928, plan information database 926, etc.). For example, planning tool 902 may receive planned loads and utility rates from client device 922 and/or plan information database 926 via communications interface 904. Planning tool 902 may use communications interface 904 to output results of the simulation to client device 922 and/or to store the results in results database 928.

Still referring to FIG. 9, processing circuit 906 is shown to include a processor 910 and memory 912. Processor 910 may be a general purpose or specific purpose processor, an application specific integrated circuit (ASIC), one or more field programmable gate arrays (FPGAs), a group of processing components, or other suitable processing components. Processor 910 may be configured to execute computer code or instructions stored in memory 912 or received from other computer readable media (e.g., CDROM, network storage, a remote server, etc.).

Memory 912 may include one or more devices (e.g., memory units, memory devices, storage devices, etc.) for storing data and/or computer code for completing and/or facilitating the various processes described in the present disclosure. Memory 912 may include random access memory (RAM), read-only memory (ROM), hard drive storage, temporary storage, non-volatile memory, flash memory, optical memory, or any other suitable memory for storing software objects and/or computer instructions. Memory 912 may include database components, object code components, script components, or any other type of information structure for supporting the various activities and information structures described in the present disclosure. Memory 912 may be communicably connected to processor 910 via processing circuit 906 and may include computer code for executing (e.g., by processor 906) one or more processes described herein.

Still referring to FIG. 9, memory 912 is shown to include a GUI engine 926, web services 914, and configuration tools 918. In an exemplary embodiment, GUI engine 916 includes a graphical user interface component configured to provide graphical user interfaces to a user for selecting or defining plan information for the simulation (e.g., planned loads, utility rates, environmental conditions, etc.). Web services 914 may allow a user to interact with planning tool 902 via a web portal and/or from a remote system or device (e.g., an enterprise control application).

Configuration tools 918 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 918 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 926) and adapt it or enable it for use in the simulation.

Still referring to FIG. 9, memory 912 is shown to include optimization module 128. Optimization module 128 may use the planned loads and utility rates to determine optimal subplant loads over a prediction window. The operation of optimization module 128 may be the same or similar as previously described with reference to FIGS. 2-4. With each iteration of the optimization process, optimization module 128 may shift the prediction window forward and apply the optimal subplant loads for the portion of the simulation period no longer in the prediction window. Optimization module 128 may use the new plan information at the end of the prediction window to perform the next iteration of the optimization process. Optimization module 128 may output the applied subplant loads to reporting applications 930 for presentation to a client device 922 (e.g., via user interface 924) or storage in results database 928.

Still referring to FIG. 9, memory 912 is shown to include reporting applications 930. Reporting applications 930 may receive the optimized subplant loads from optimization module 128 and, in some embodiments, costs associated with the optimized subplant loads. Reporting applications 930 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize subplant loads and the costs associated therewith and provide the results to a user via a GUI. The GUI elements may include charts or histograms that allow the user to visually analyze the results of the simulation. An exemplary output that may be generated by reporting applications 930 is shown in FIG. 10.

Figure 10:
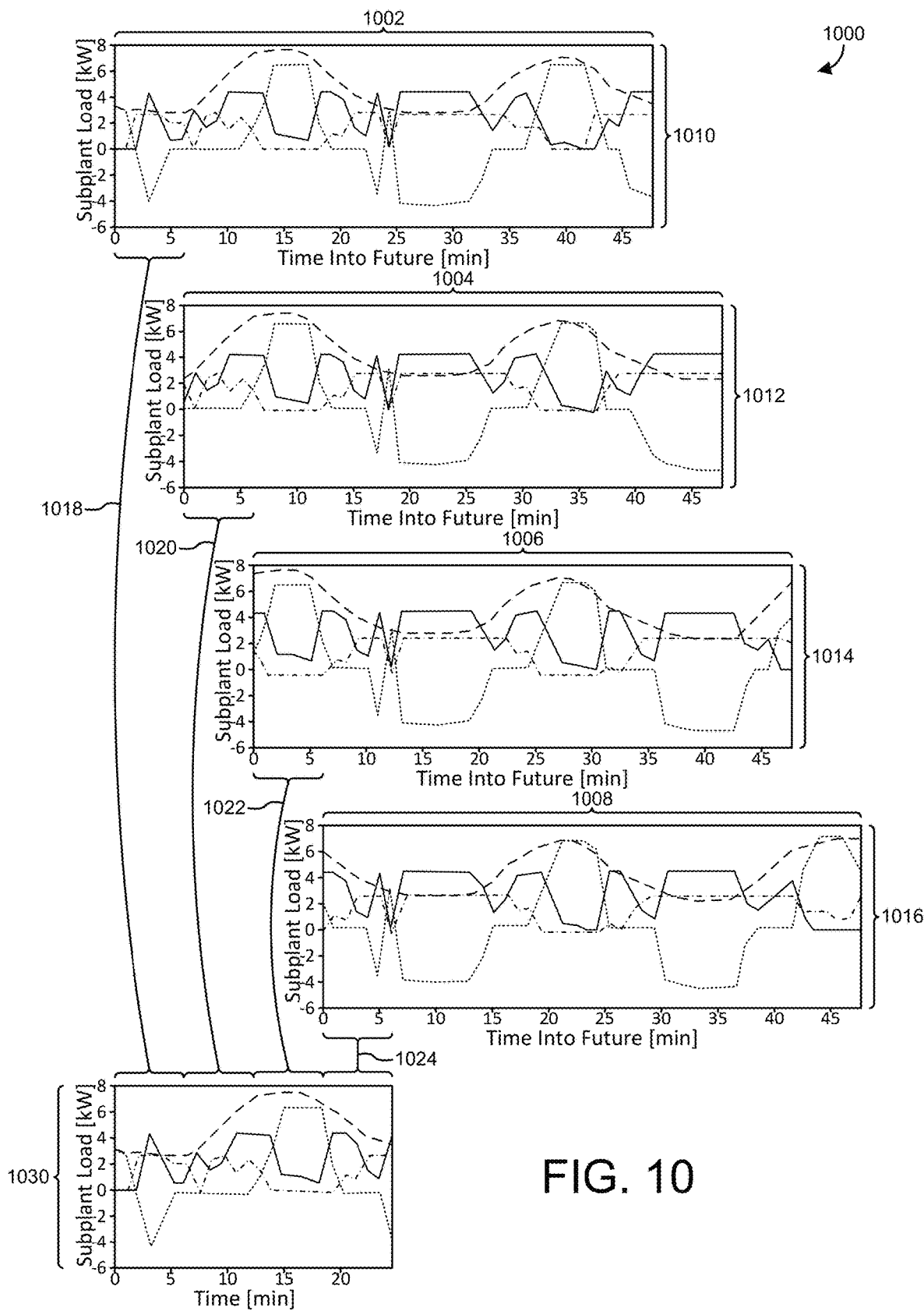
FIG. 10 is a drawing illustrating the operation of the planning system of FIG. 9, according to an exemplary embodiment.

Referring now to FIG. 10, several graphs 1000 illustrating the operation of planning tool 902 are shown, according to an exemplary embodiment. With each iteration of the optimization process, planning tool 902 selects an optimization period (i.e., a portion of the simulation period) over which the optimization is performed. For example, planning tool 902 may select optimization period 1002 for use in the first iteration. Once the optimal load distribution 1010 has been determined, planning tool 902 may select a portion 1018 of load distribution 1010 to send to plant dispatch 1030. Portion 1018 may be the first b time steps of load distribution 1010. Planning tool 902 may shift the optimization period 1002 forward in time, resulting in optimization period 1004. The amount by which the prediction window is shifted may correspond to the duration of time steps b.

Planning tool 902 may repeat the optimization process for optimization period 1004 to determine the optimal plant load distribution 1012. Planning tool 902 may select a portion 1020 of plant load distribution 1012 to send to plant dispatch 1030. Portion 1020 may be the first b time steps of load distribution 1012. Planning tool 902 may then shift the prediction window forward in time, resulting in optimization period 1006. This process may be repeated for each subsequent optimization period (e.g., optimization periods 1006, 1008, etc.) to generate updated load distributions (e.g., load distributions 1014, 1016, etc.) and to select portions of each load distribution (e.g., portions 1022, 1024) to send to plant dispatch 1030. Plant dispatch 1030 includes the first b time steps 1018-1024 from each of optimization periods 1002-1008. Once the optimal subplant load distribution 1030 is compiled for the entire simulation period, the results may be sent to reporting applications 930, results database 928, and/or client device 922, as described with reference to FIG. 9.

Figure 11:
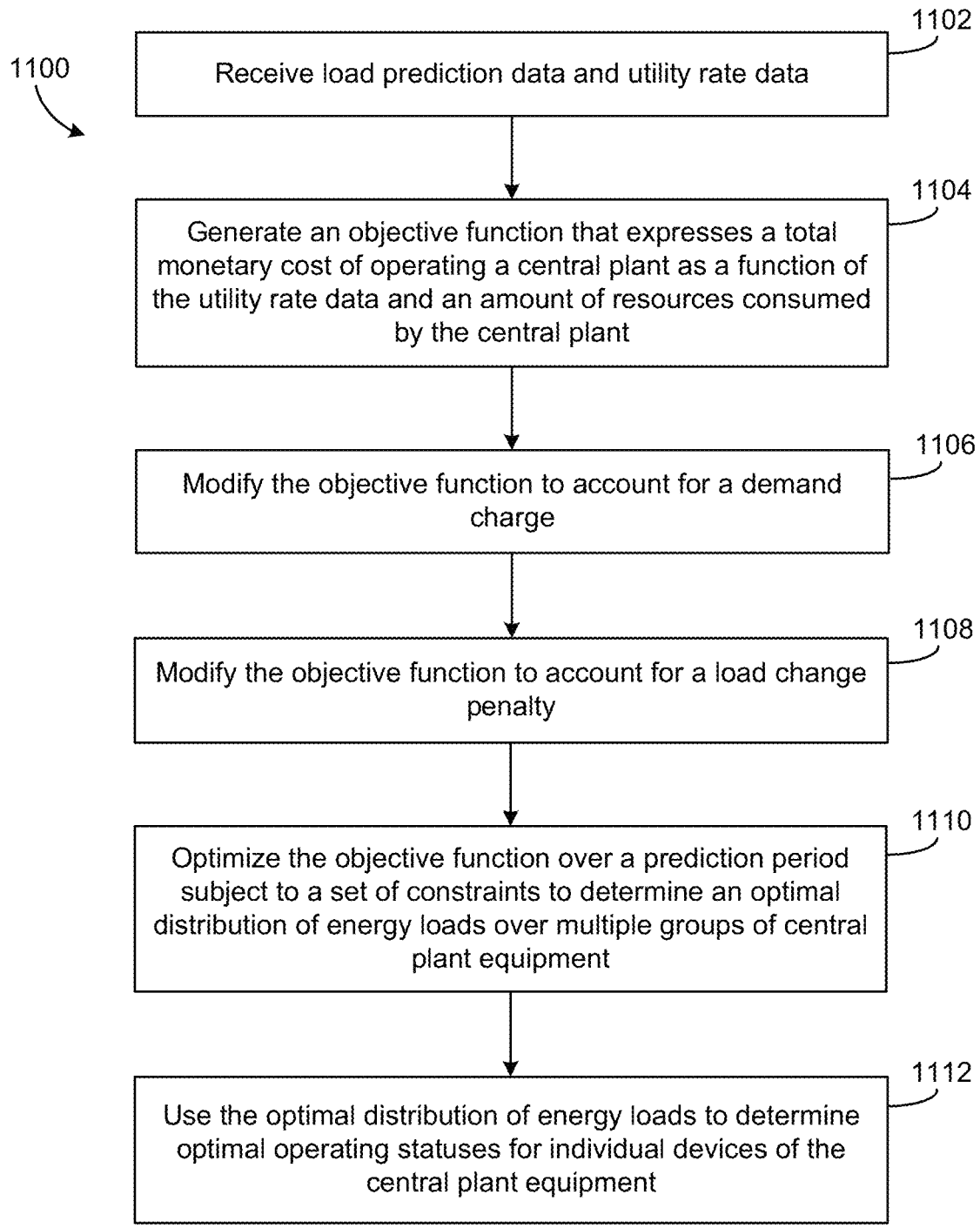
FIG. 11 is a flowchart of a process for optimizing cost in a central plant that may be performed by the central plant controller of FIG. 2 or the planning system of FIG. 9, according to an exemplary embodiment.

Referring now to FIG. 11, a flowchart of a process 1100 for optimizing cost in a central plant is shown, according to an exemplary embodiment. In various implementations, process 1100 may be performed by central plant controller 102 or planning tool 902. The central plant may include a plurality of subplants (e.g., subplants 12-22) configured to serve the energy loads of a building or campus. The central plant may be an actual plant (e.g., central plant 10) or a simulated central plant including a plurality of simulated subplants.

Process 1100 is shown to include receiving load prediction data and utility rate data (step 1102). The load prediction data may include predicted or planned thermal energy loads for a building or campus for each time step k (e.g., k=1 . . . n) of an optimization period. The load prediction data may include predicted or planned values one or more different types of loads for the building or campus. For example, the load prediction data may include a predicted hot water load $\hat{\ell}_{Hot,k}$ and a predicted cold water load $\hat{\ell}_{Cold,k}$ for each time step k within the prediction window.

In some embodiments, the load prediction data are based on weather forecasts from a weather service and/or feedback from the building or campus. Feedback from the building or campus may include various types of sensory inputs (e.g., temperature, flow, humidity, enthalpy, etc.) or other data relating to the controlled building (e.g., inputs from a HVAC system, a lighting control system, a security system, a water system, etc.). In some embodiments, the load prediction data are generated by load/rate prediction module 122, as described with reference to FIG. 2. For example, the load prediction data may be based on a measured electric load and/or previous measured load data from the building or campus. The load prediction data may be a function of a given weather forecast ($\hat{\phi}_w$), a day type (day), the time of day (t), and/or previous measured load data ($Y_{k-1}$). Such a relationship is expressed in the following equation:

$$\hat{\ell}_k = f(\hat{\phi}_w, \text{day}, t | Y_{k-1})$$

The utility rate data may indicate a cost or price per unit of one or more resources (e.g., electricity, natural gas, water, etc.) consumed by the central plant to serve the thermal energy loads of the building or campus at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates (e.g., received from utilities 126) or predicted utility rates (e.g., estimated by load/rate prediction module 122).

In some embodiments, the utility rates include demand charges for one or more of the resources consumed by the central plant. A demand charge may define a separate cost based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. The utility rate data may include time-variable (e.g., hourly) prices, a maximum service level (e.g., a maximum rate of consumption allowed by the physical infrastructure or by contract) and, in the case of electricity, a demand charge or a charge for the peak rate of consumption within a certain period.

Still referring to FIG. 11, process 1100 is shown to include generating an objective function that expresses a total monetary cost of operating the central plant as a function of the utility rate data and an amount of resources consumed by the central plant (step 1104). In some embodiments, the objective function is a high level cost function $J_{HL}$ for the central plant. The high level cost function $J_{HL}$ may represent the sum of the monetary costs of each utility consumed by the central plant for the duration of the optimization period. For example, the high level cost function $J_{HL}$ may be described using the following equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right]$$

where $n_h$ is the number of time steps k in the optimization period, $n_s$ is the number of subplants, $t_s$ is the duration of a time step, $c_{jk}$ is the economic cost of utility j at a time step k of the optimization period, and $u_{jik}$ is the rate of use of utility j by subplant i at time step k.

In some embodiments, the objective function is generated using a linear programming framework. For example, step 1104 may include generating an objective function of the form:

$$\underset{x}{\text{argmin}}\, c^T x;\ \text{subject to}\ Ax \le b,\ Hx = g$$

where c is a cost vector, x is a decision matrix, A and b are a matrix and vector (respectively) which describe inequality constraints on the variables in the decision matrix x, and H and g are a matrix and vector (respectively) which describe equality constraints on the variables in the decision matrix x. In other embodiments, the objective function may be generated using any of a variety of other optimization frameworks (e.g., quadratic programming, linear-fractional programming, nonlinear programming, combinatorial algorithms, etc.).

In some embodiments, step 1104 includes formulating the decision matrix x. The loads across each of subplants 12-22 may be the decision variables in the decision matrix x. For example, for a central plant that includes chillers, heat recovery chillers, hot water generators, and thermal energy storage, step 1104 may include formulating the decision matrix x as:

$$x = [\dot{Q}_{Chiller,1}\ \ldots\ n,\ \dot{Q}_{hrChiller,1}\ \ldots\ n,\ \dot{Q}_{Heater,1}\ \ldots\ n, \dot{Q}_{HotStorage,1}\ \ldots\ n,\ \dot{Q}_{ColdStorage,1}\ \ldots\ n]^T$$

where $\dot{Q}_{Chiller,1\ldots n}$, $\dot{Q}_{hrChiller,1\ldots n}$, $\dot{Q}_{Heater,1\ldots n}$, $\dot{Q}_{HotStorage,1\ldots n}$, and $\dot{Q}_{ColdStorage,1\ldots n}$ are n-dimensional vectors representing the thermal energy load assigned to chiller subplant 16, heat recovery chiller subplant 14, heater subplant 12, hot TES subplant 20, and cold TES subplant 22, respectively, for each of the n time steps within the optimization period.

In some embodiments, step 1104 includes generating the decision matrix x to include one or more decision vectors representing the resource consumption of each subplant. For example, for a central plant that includes a chiller subplant, step 1104 may include generating the decision matrix x as follows:

$$x = [\ldots \dot{Q}_{Chiller,1 \ldots n} \ldots u_{Chiller,elec,1 \ldots n}\ u_{Chiller,water,1 \ldots n} \ldots]^T$$

where $u_{Chiller,elec,1 \ldots n}$ and $u_{Chiller,water,1 \ldots n}$ are n-dimensional vectors representing the amount of electrical consumption and water consumption, respectively, by the chiller subplant at each time step k.

Step 1104 may include adding one or more resource consumption vectors to matrix x for each of subplants 12-22. The decision vectors added in step 1104 for a given subplant may represent an amount of resource consumption for each resource consumed by the subplant (e.g., water, electricity, natural gas, etc.) at each time step k within the optimization period. For example, if a heater subplant consumes natural gas, electricity, and water, step 1104 may include adding a decision vector $u_{Heater,gas,1 \ldots n}$ representing an amount of natural gas consumed by the heater subplant at each time step, a decision vector $u_{Heater,elec,1 \ldots n}$ representing an amount of electricity consumed by the heater subplant at each time step, and a decision vector $u_{Heater,water,1 \ldots n}$ representing an amount of water consumed by the heater subplant at each time step. Step 1104 may include adding resource consumption vectors for other subplants in a similar manner.

In some embodiments, step 1104 includes generating the cost vector c. Generating the cost vector c may include adding economic costs associated with the resource consumption required to produce the subplant loads. For example, the decision matrix x provided above, step 1104 may include generating the cost vector c as follows:

$$c = [\ldots 0_n \ldots c_{elec,1 \ldots n}\ c_{water,1 \ldots n} \ldots]^T$$

where $0_n$ is a n-dimensional zero vector indicating that the direct economic cost of $\dot{Q}_{Chiller,1 \ldots n}$ is zero at each time step, $c_{elec,1 \ldots n}$ is a n-dimensional vector indicating the per unit cost of electricity at each time step, and $c_{water,1 \ldots n}$ is a n-dimensional vector indicating the per unit cost of water at each time step. The cost vector associates an economic cost with the resources consumed to produce the subplant loads rather than the subplant loads themselves. In some embodiments, the values for $c_{elec,1 \ldots n}$ and $c_{water,1 \ldots n}$ are utility rates obtained from the utility rate data received in step 1102.

In some embodiments, step 1104 includes generating the A matrix and the b vector which describe the inequality constraints, and the H matrix and the g vector which describe the equality constraints. The inequality constraints and equality constraints may be generated by inequality constraints module 146 and equality constraints module 148, as described with reference to FIG. 4. For example, step 1104 may include generating inequality constraints that constrain the decision variables in matrix x to be less than or equal to maximum capacities for the corresponding central plant equipment and less than or equal to maximum charge/discharge rates for thermal energy storage. Step 1104 may include generating inequality constraints that prevent charging the thermal energy storage above maximum capacity and/or discharging the thermal energy storage below zero. Step 1104 may include generating equality constraints that ensure the building energy loads are satisfied at each of the time steps in the prediction window.

In some embodiments, step 1104 includes modifying the objective function to account for unmet loads (e.g., as described with reference to unmet loads module 150), to account for heat extraction or rejection to a ground loop (e.g., as described with reference to ground loop module 152), to account for heat exchange between the hot water loop and the condenser water loop (e.g., as described with reference to heat exchanger module 154), to account for subplant curves that are not simple linear functions of load (e.g., as described with reference to subplant curves module 170), and/or to force the thermal energy storage tanks to full at the end of the prediction window (e.g., as described with reference to tank forced full module 160). Modifying the objective function may include modifying the decision matrix x, the cost vector c, the A matrix and the b vector which describe the inequality constraints, and/or the H matrix and the g vector which describe the equality constraints.

Still referring to FIG. 11, process 1100 is shown to include modifying the objective function to account for a demand charge (step 1106). Step 1106 is an optional step that may be performed by demand charge module 156 to account for a demand charge that may be imposed by utility providers in some pricing scenarios. The demand charge is an additional charge imposed by some utility providers based on the maximum rate of energy consumption during an applicable demand charge period. For example, the demand charge may be provided in terms of dollars per unit of power (e.g., $/kW) and may be multiplied by the peak power usage (e.g., kW) during a demand charge period to calculate the demand charge.

Accounting for the demand charge may include modifying the various components of the objective function such as the decision matrix x, the cost vector c, and/or the A matrix and the b vector which describe the inequality constraints. The modified objective function may be defined as:

$$\operatorname*{argmin}_{x}[c^T x + c_{demand}\max(P_{elec,k})]; \text{ subject to } Ax \leq b,\ Hx = g$$

where $c_{demand}$ is the demand charge for the applicable demand charge period and $P_{elec,k}$ is the total electrical power consumption of the central plant and the building/campus at time step k. The term $\max(P_{elec,k})$ selects the peak electrical power consumption at any time during the demand charge period. The demand charge $c_{demand}$ and the demand charge period may be defined by the utility rate information received in step 1102.

Step 1106 may include modifying the decision matrix x by adding a new decision variable $x_{peak}$ as follows:

$$x_{new} = [\ldots\ u_{Chiller,elec,1 \ldots n} \ldots u_{hpChiller,elec,1 \ldots n} \ldots u_{Heater,elec,1 \ldots n} \ldots x_{peak}]^T$$

where $x_{peak}$ is the peak power consumption within the optimization period. Step 1106 may include modifying the cost vector c as follows:

$$c_{new} = [\ldots c_{elec,1 \ldots n} \ldots c_{elec,1 \ldots n} \ldots c_{elec,1 \ldots n} \ldots c_{demand}]^T$$

such that the demand charge $c_{demand}$ is multiplied by the peak power consumption $x_{peak}$.

Step 1106 may include generating and/or imposing inequality constraints to ensure that the peak power consumption $x_{peak}$ is greater than or equal to the maximum electric demand for each time step in the optimization period. I.e.:

$$x_{peak} \geq \max(u_{Chiller,elec,k} + u_{hpChiller,elec,k} + u_{Heater,elec,k} + P_{elec,campus,k}) \forall k \in \text{horizon}$$

This inequality constraint may be represented in the linear optimization framework by defining the A matrix and the b vector as follows:

$$A = [\ldots [I_h] \ldots [I_h] \ldots [I_h] \ldots -1],$$
$$b = -P_{elec,campus,k}$$

Step 1106 may include generating and/or imposing an inequality constraint to ensure that the peak power consumption decision variable $x_{peak}$ is greater than or equal to its previous value $x_{peak,previous}$ during the demand charge period. This inequality constraint may be represented in the linear optimization framework by defining the A matrix and the b vector as follows:

$$A = [\ldots -1], b = -x_{peak,previous}$$

Advantageously, the modifications to the decision variable matrix x, the cost vector c, and the inequality constraints in step 1106 may allow the objective function to be written in a linear form as follows:

$$\operatorname*{argmin}_{x}[c_{new}^T x_{new}] = \operatorname*{argmin}_{x}[c^T x + c_{demand} x_{peak}];$$

subject to $Ax \leq b$, $Hx = g$

This linear form of the objective function can be used in the linear optimization framework.

In some embodiments, step 1106 includes applying a weighting factor to at least one of the consumption term and the demand charge term of the objective function. For example, the objective function as written in the previous equation has components that are over different time periods. The consumption term $c^T x$ is over the consumption period whereas the demand charge term $c_{demand} x_{peak}$ is over the demand charge period. To properly make the trade-off between increasing the demand charge versus increasing the cost of energy consumption, step 1106 may include applying a weighting factor to the demand charge term and/or the consumption term. For example, step 1106 may include dividing the consumption term $c^T x$ by the duration h of the consumption period (i.e., the time period between the current time and the time horizon) and multiplying by the amount of time $d_{demand}$ remaining in the current demand charge period so that the entire objective function is over the demand charge period. The new optimization function may be given by:

$$\operatorname*{argmin}_{x}\left[\frac{d_{demand}}{h} c^T x + c_{demand} x_{peak}\right]; \text{ subject to } Ax \leq b, Hx = g$$

which is equivalent to:

$$\operatorname*{argmin}_{x}\left[c^T x + \frac{h}{d_{demand}} c_{demand} x_{peak}\right]; \text{ subject to } Ax \leq b, Hx = g$$

The latter form of the new optimization function has the advantage of adjusting only one term of the function rather than several.

Still referring to FIG. 11, process 1100 is shown to include modifying the objective function to account for a load change penalty (step 1108). Step 1108 is an optional step that may be performed by load change penalty module 158 to account for the cost of changing the loads assigned to each of the subplants. In some instances, the lowest cost solution from a resource consumption standpoint may involve taking a subplant from off to full load and back to off again within only a few time steps. However, operating the central plant in such a way may be undesirable due to various negative effects of rapidly changing the subplant loads (e.g., increased equipment degradation), especially if the cost saved is relatively minimal (e.g., a few cents or dollars).

Step 1108 may include modifying the objective function to introduce a penalty for rapidly changing the subplant loads. In some embodiments, step 1108 includes modifying the decision matrix x by adding a new decision vector for each subplant. The new decision vectors represent the change in subplant load for each subplant from one time step to the next. For example, step 1108 may include modifying the decision matrix x as follows:

$$x = [\ldots \dot{Q}_{Chiller,1} \ldots n \ldots \dot{Q}_{hrChiller,1} \ldots n \ldots$$
$$\dot{Q}_{Heater,1} \ldots n \ldots \delta_{Chiller,1} \ldots n$$
$$\delta_{hrChiller,1} \ldots n \delta_{Heater,1} \ldots n]^T$$

where $\delta_{Chiller,1 \ldots n}$, $\delta_{hrChiller,1 \ldots n}$, and $\delta_{Heater,1 \ldots n}$ are n-dimensional vectors representing the change in subplant load for $\dot{Q}_{Chiller,1 \ldots n}$, $\dot{Q}_{hrChiller,1 \ldots n}$, and $\dot{Q}_{Heater,1 \ldots n}$, respectively, at each time step k relative to the previous time step k−1.

Step 1108 may include modifying the cost vector c to add a cost associated with changing the subplant loads. For example, step 1108 may include modifying the cost vector c as follows:

$$c = [\ldots 0_n \ldots 0_n \ldots 0_n \ldots$$
$$c_{\delta Chiller,1 \ldots n} c_{\delta hrChiller,1 \ldots n} c_{\delta Heater,1 \ldots n}]^T$$

Step 1108 may include adding constraints such that each of the load change variables δ cannot be less than the change in the corresponding subplant load $\dot{Q}$. For example, the added constraints for a chiller subplant may have the following form:

$$A = \begin{bmatrix} \ldots & I_h - D_{-1} & \ldots & -[I_h] & [0_h] & [0_h] \\ \ldots & D_{-1} - I_h & \ldots & -[I_h] & [0_h] & [0_h] \\ \vdots & \vdots & \vdots & \vdots & \vdots & \vdots \end{bmatrix}, b = \begin{bmatrix} \begin{bmatrix} \dot{Q}_{Chiller,old} \\ 0_{h-1} \end{bmatrix} \\ \begin{bmatrix} -\dot{Q}_{Chiller,old} \\ 0_{h-1} \end{bmatrix} \\ \vdots \end{bmatrix}$$

where $\dot{Q}_{Chiller,old}$ is the value for $\dot{Q}_{Chiller}$ at the previous time step. Similar constraints may be added for each of subplants 12-22. The constraints added by in step 1108 may require that the load change variables δ are greater than or equal to the magnitude of the difference between the current value of the corresponding subplant load $\dot{Q}$ and the previous value of the subplant load $\dot{Q}_{old}$.

Still referring to FIG. 11, process 1100 is shown to include optimizing the objective function over an optimization period subject to a set of constraints to determine an optimal distribution of energy loads over multiple groups of central plant equipment (step 1110). The set of constraints may include the inequality constraints and the equality constraints formulated in steps 1104, 1106, and/or 1108. Optimizing the objective function may include determining an optimal decision matrix x* that minimizes the cost function $c^T x$. The optimal decision matrix x* may correspond to the optimal decisions $\theta_{HL}{}^*$ (for each time step k within an optimization period) that minimize the high level cost function $J_{HL}$, as described with reference to FIG. 3.

Step 1110 may include using any of a variety of linear optimization techniques to determine the optimal decision matrix. For example, step 1110 may include using basis exchange algorithms (e.g., simplex, crisscross, etc.), interior point algorithms (e.g., ellipsoid, projective, path-following, etc.), covering and packing algorithms, integer programming algorithms (e.g., cutting-plant, branch and bound, branch and cut, branch and price, etc.), or any other type of linear optimization algorithm or technique to solve for the optimal decision matrix subject to the optimization constraints. For embodiments in which nonlinear optimization is used, step 1110 may include using any of a variety of nonlinear optimization techniques to solve for the optimal decision matrix. The result of step 1110 may be an optimal distribution of energy loads over the multiple groups of subplant equipment (i.e., the multiple subplants) for each of the time steps k.

Still referring to FIG. 11, process 1100 is shown to include using the optimal distribution of energy loads to determine optimal operating statuses for individual devices of the central plant equipment (step 1112). In some embodiments, step 1112 is performed by low level optimization module 132, as described with reference to FIGS. 2-4. For example, step 1112 may include using the subplant loads determined in step 1110 to determine optimal low level decisions $\theta_{LL}{}^*$ (e.g. binary on/off decisions, flow setpoints, temperature setpoints, etc.) for the central plant equipment. In some embodiments, step 1112 is performed for each of the plurality of subplants.

Step 1112 may include determining which devices of each subplant to use and/or the operating setpoints for such devices that will achieve the subplant load setpoint while minimizing energy consumption. The low level optimization performed in step 1112 may be described using the following equation:

$$\theta_{LL}^* = \operatorname*{argmin}_{\theta_{LL}} J_{LL}(\theta_{LL})$$

where $\theta_{LL}{}^*$ contains the optimal low level decisions and $J_{LL}$ is the low level cost function.

To find the optimal low level decisions $\theta_{LL}{}^*$, step 1112 may include minimizing the low level cost function $J_{LL}$. The low level cost function $J_{LL}$ may represent the total energy consumption for all of the equipment in the applicable subplant. The low level cost function $J_{LL}$ may be described using the following equation:

$$J_{LL}(\theta_{LL}) = \sum_{j=1}^{N} t_s \cdot b_j \cdot u_j(\theta_{LL})$$

where N is the number of devices of in the subplant, $t_s$ is the duration of a time step, $b_j$ is a binary on/off decision (e.g., 0=off, 1=on), and $u_j$ is the energy used by device j as a function of the setpoint $\theta_{LL}$. Each device may have continuous variables which can be changed to determine the lowest possible energy consumption for the overall input conditions.

In some embodiments, step 1112 includes minimizing the low level cost function $J_{LL}$ subject to inequality constraints based on the capacities of the subplant equipment and equality constraints based on energy and mass balances. In some embodiments, the optimal low level decisions $\theta_{LL}{}^*$ are constrained by switching constraints defining a short horizon for maintaining a device in an on or off state after a binary on/off switch. The switching constraints may prevent devices from being rapidly cycled on and off.

Step 1112 may include determining optimum operating statuses (e.g., on or off) for a plurality of devices of the central plant equipment. According to an exemplary embodiment, the on/off combinations may be determined using binary optimization and quadratic compensation. Binary optimization may minimize a cost function representing the power consumption of devices in the applicable subplant. In some embodiments, non-exhaustive (i.e., not all potential combinations of devices are considered) binary optimization is used. Quadratic compensation may be used in considering devices whose power consumption is quadratic (and not linear).

Step 1112 may include determining optimum operating setpoints for equipment using nonlinear optimization. Nonlinear optimization may identify operating setpoints that further minimize the low level cost function $J_{LL}$. In some embodiments, step 1112 includes providing the on/off decisions and setpoints to building automation system 108 for use in controlling the central plant equipment 60.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for equipment that operate to provide heating or cooling to a building or campus, the controller comprising:
  a processing circuit configured to:
    obtain an objective function that expresses a control objective as a function of an amount of one or more input resources consumed by the equipment at each of a plurality of time steps of an optimization period;
    determine a relationship between (i) the amount of the one or more input resources consumed by the equipment and (ii) an amount of one or more output resources produced by the equipment as a result of consuming the one or more input resources;
    optimize the objective function over the optimization period, and subject to a constraint based on the relationship, to determine a distribution of production of the one or more output resources across the equipment at each of the plurality of time steps; and
    operate the equipment to achieve the distribution at each of the plurality of time steps.

2. The controller of claim 1, wherein the processing circuit is configured to predict a demand for the one or more output resources using at least one of input from sensors within the building or campus or weather data for a location of the building or campus.

3. The controller of claim 1, wherein the equipment comprise a plurality of subplants of a central plant and operate to provide the heating or cooling to the building or campus by heating or cooling a working fluid that is circulated to air handlers of the building or campus, wherein the one or more output resources comprise at least one of a cooled working fluid or a heated working fluid.

4. The controller of claim 1, wherein the equipment comprise at least one of air handlers, dampers, or fans of the building or campus and operate to provide the heating or cooling to the building or campus by delivering heated or cooled air to one or more zones of the building or campus, wherein the one or more output resources comprise at least one of the heated air or the cooled air.

5. The controller of claim 1, wherein:
  the relationship defines the amount of the one or more output resources produced by the equipment as a function of the amount of the one or more input resources consumed by the equipment; and
  the processing circuit is configured to use the relationship to predict the amount of the one or more resources consumed by the equipment to produce a corresponding amount of the one or more output resources.

6. The controller of claim 1, wherein the processing circuit is configured to determine or update the relationship using experimental data obtained by operating the equipment.

7. The controller of claim 1, wherein the objective function comprises cost variables representing a monetary cost associated with each of the one or more input resources consumed by the equipment at each of the plurality of time steps.

8. A controller for equipment that operate to provide heating or cooling to a building or campus, the controller comprising:
  a processing circuit configured to:
    obtain an objective function that expresses a control objective as a function of an amount of one or more input resources consumed by the equipment at each of a plurality of time steps of an optimization period;
    determine a relationship between (i) the amount of the one or more input resources consumed by the equipment and (ii) production variables representing amounts of one or more output resources produced by the equipment as a result of consuming the one or more input resources, wherein the production variables are based on the amount of the one or more input resources consumed by the equipment at each of the plurality of time steps;
    optimize the objective function over the optimization period to determine a distribution of production of the one or more output resources across the equipment at each of the plurality of time steps, wherein determining the distribution comprises determining values for the production variables; and
    operate the equipment to achieve the distribution at each of the plurality of time steps.

9. The controller of claim 8, wherein the processing circuit is configured to predict a demand for the one or more output resources using at least one of input from sensors within the building or campus or weather data for a location of the building or campus.

10. The controller of claim 8, wherein the equipment comprise a plurality of subplants of a central plant and operate to provide the heating or cooling to the building or campus by heating or cooling a working fluid that is circulated to air handlers of the building or campus.

11. The controller of claim 8, wherein the equipment comprise at least one of air handlers, dampers, or fans of the building or campus and operate to provide the heating or cooling to the building or campus by delivering heated or cooled air to one or more zones of the building or campus.

12. The controller of claim 8, wherein the processing circuit is configured to optimize the objective function over the optimization period subject to a constraint based on the relationship.

13. A method for operating equipment to provide heating or cooling to a building or campus, the method comprising:
  obtaining an objective function that expresses a control objective as a function of an amount of one or more input resources consumed by the equipment at each of a plurality of time steps of an optimization period;
  determining a relationship between (i) the amount of the one or more input resources consumed by the equipment and (ii) an amount of one or more output resources produced by the equipment as a result of consuming the one or more input resources;
  optimizing the objective function over the optimization period, and subject to a constraint based on the relationship, to determine a distribution of production of the one or more output resources across the equipment at each of the plurality of time steps; and operating the equipment to achieve the distribution at each of the plurality of time steps.

14. The method of claim 13, comprising predicting a demand for the one or more output resources using at least one of input from sensors within the building or campus or weather data for a location of the building or campus.

15. The method of claim 13, wherein the equipment comprise a plurality of subplants of a central plant and operate to provide the heating or cooling to the building or campus by heating or cooling a working fluid that is circulated to air handlers of the building or campus.

16. The method of claim 13, wherein the equipment comprise at least one of air handlers, dampers, or fans of the building or campus and operate to provide the heating or cooling to the building or campus by delivering heated or cooled air to one or more zones of the building or campus.

17. The method of claim 13, wherein the relationship defines the amount of the one or more output resources produced by the equipment as a function of the amount of the one or more input resources consumed by the equipment; and the method comprises using the relationship to predict the amount of the one or more resources consumed by the equipment to produce a corresponding amount of the one or more output resources.

18. The method of claim 13, comprising determining or updating the relationship using experimental data obtained by operating the equipment.

19. The method of claim 13, wherein the objective function comprises:

cost variables representing a monetary cost associated with each of the one or more input resources consumed by the equipment at each of the plurality of time steps; and consumption variables representing the amount of the one or more input resources consumed by the equipment at each of the plurality of time steps.

20. The method of claim 13, comprising performing the optimization subject to a constraint that requires the amount of the one or more output resources produced by the equipment to satisfy a demand of the building or campus for the one or more output resources.

* * * * *